(12) United States Patent
Cvetkovich et al.

(10) Patent No.: US 12,211,044 B2
(45) Date of Patent: Jan. 28, 2025

(54) SECURE ONE-TOUCH TRANSACTION SYSTEM AND METHOD

(71) Applicant: KUBERA LIMITED LIABILITY COMPANY, Loveland, CO (US)

(72) Inventors: Benjamin M. Cvetkovich, Loveland, CO (US); Greg T. Meyers, Providence, UT (US)

(73) Assignee: KUBERA LIMITED LIABILITY COMPANY, Loveland, CO (US)

( * ) Notice: Subject to any disclaimer, the term of this patent is extended or adjusted under 35 U.S.C. 154(b) by 0 days.

(21) Appl. No.: 18/791,131

(22) Filed: Jul. 31, 2024

(65) Prior Publication Data

US 2024/0394711 A1   Nov. 28, 2024

Related U.S. Application Data

(63) Continuation-in-part of application No. 18/614,232, filed on Mar. 22, 2024, now Pat. No. 12,100,004, (Continued)

(51) Int. Cl.
*G06Q 20/40* (2012.01)
*G06Q 20/18* (2012.01)
(Continued)

(52) U.S. Cl.
CPC ......... *G06Q 20/4014* (2013.01); *G06Q 20/18* (2013.01); *G06Q 20/3274* (2013.01); *H04L 9/3213* (2013.01); *H04L 2209/56* (2013.01)

(58) Field of Classification Search
CPC ...................................................... G06Q 20/20
(Continued)

(56) References Cited

U.S. PATENT DOCUMENTS 6,227,447 B1   5/2001   Campisano
2014/0052553 A1   2/2014   Uzo
(Continued)

OTHER PUBLICATIONS

Wikipedia, Virtual private network, Jul. 16, 2023, https://en.wikipedia.org/w/index.php?title=Virtual_private_network&oldid=1165634451.

(Continued)

*Primary Examiner* — Cho Kwong
(74) *Attorney, Agent, or Firm* — HOLLOWELL PATENT GROUP; Kelly Hollowell

(57) ABSTRACT

Herein disclosed are secure digital transaction systems and methods wherein in response to a merchant device receiving a transaction initiation indication comprising a purchase request referencing a payer device, sending an encrypted transaction information message to the payer device from the merchant device using at least a VPN. The encrypted transaction information message may comprise a merchant ID, a security key and transaction information referencing the purchase request, permitting one-touch control of the secured transaction by the payer and eliminating payer account theft along the merchant transaction chain. The payer may subscribe to a service configured to permit the merchant to autonomously push a transaction information message to the payer device. An implementation may advantageously remove sensitive payer data such as account information and/or card numbers from the electronic transaction chain with the merchant, eliminating payer account number theft because there is no payer account data available to be stolen.

30 Claims, 14 Drawing Sheets

Related U.S. Application Data which is a continuation of application No. 18/534,751, filed on Dec. 11, 2023, now Pat. No. 12,026,714, which is a continuation-in-part of application No. 17/557,030, filed on Dec. 20, 2021, now abandoned, which is a continuation of application No. 16/237,038, filed on Dec. 31, 2018, now abandoned.

(60) Provisional application No. 62/643,029, filed on Mar. 14, 2018.

(51) Int. Cl.
  *G06Q 20/32* (2012.01)
  *H04L 9/32* (2006.01)

(58) Field of Classification Search
  USPC .......................................................... 705/44
  See application file for complete search history.

(56) References Cited

U.S. PATENT DOCUMENTS

| | | |
|---|---|---|
| 2015/0154597 A1 | 6/2015 | Bacastow |
| 2015/0248664 A1 | 9/2015 | Makhdumi |

OTHER PUBLICATIONS

Wikipiedia, OpenVPN, Nov. 13, 2023, https://en.wikipedia.org/w/index.php?title=OpenVPN&oldid=1184846025.

SECURE ONE-TOUCH TRANSACTION SYSTEM AND METHOD

CROSS REFERENCE TO RELATED APPLICATIONS

This application is a continuation-in-part of U.S. application Ser. No. 18/614,232 filed Mar. 22, 2024, which is a continuation of U.S. application Ser. No. 18/534,751 filed Dec. 11, 2023, which is a continuation-in-part of U.S. application Ser. No. 17/557,030 filed Dec. 20, 2021, which is a continuation of U.S. application Ser. No. 16/237,038 filed Dec. 31, 2018, which claims the benefit of U.S. Provisional Application No. 62/643,029 filed Mar. 14, 2018, and this application incorporates the entire contents of the above-referenced applications herein by reference.

SUMMARY

Herein disclosed are secure digital transaction systems and methods wherein in response to a merchant device receiving a transaction initiation indication comprising a purchase request referencing a payer device, sending an encrypted transaction information message to the payer device from the merchant device using at least a VPN. The encrypted transaction information message may comprise a merchant ID, a security key and transaction information referencing the purchase request, permitting one-touch control of the secured transaction by the payer and eliminating payer account theft along the merchant transaction chain. The payer may subscribe to a service configured to permit the merchant to autonomously push a transaction information message to the payer device. An implementation may advantageously remove sensitive payer data such as account information and/or card numbers from the electronic transaction chain with the merchant, eliminating payer account number theft because there is no payer account data available to be stolen.

Embodiments of the present disclosure will now be described, by way of example only, with reference to the following drawings.

Figure 1:
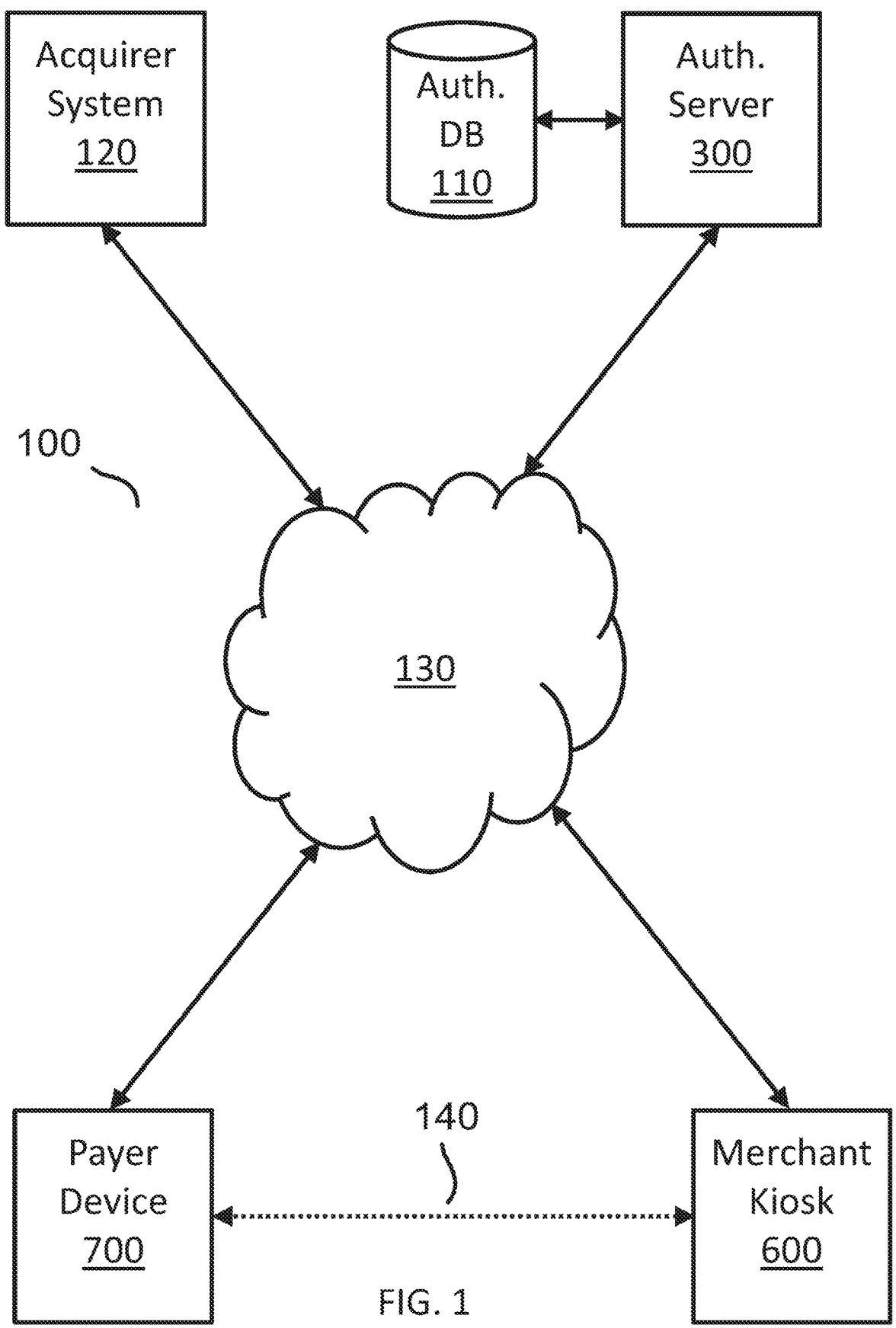

FIG. 1 schematically illustrates the exemplary distributed payer-controlled payment system architecture 100 in a network environment suitable for practicing methods, systems and computer program products for payment authorization.

Figure 2:
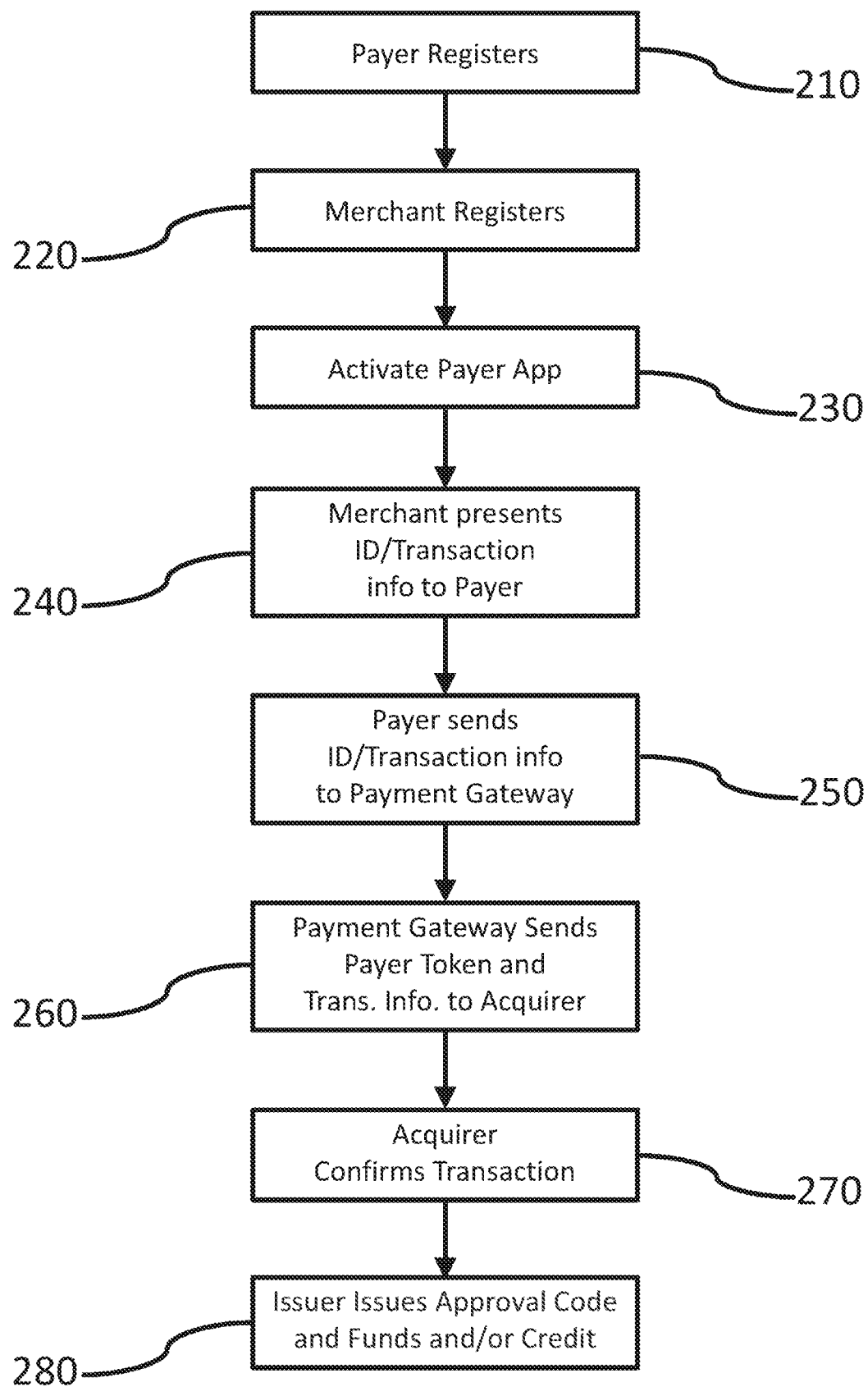

FIG. 2 illustrates an example flow of a method for payment authorization.

Figure 3:
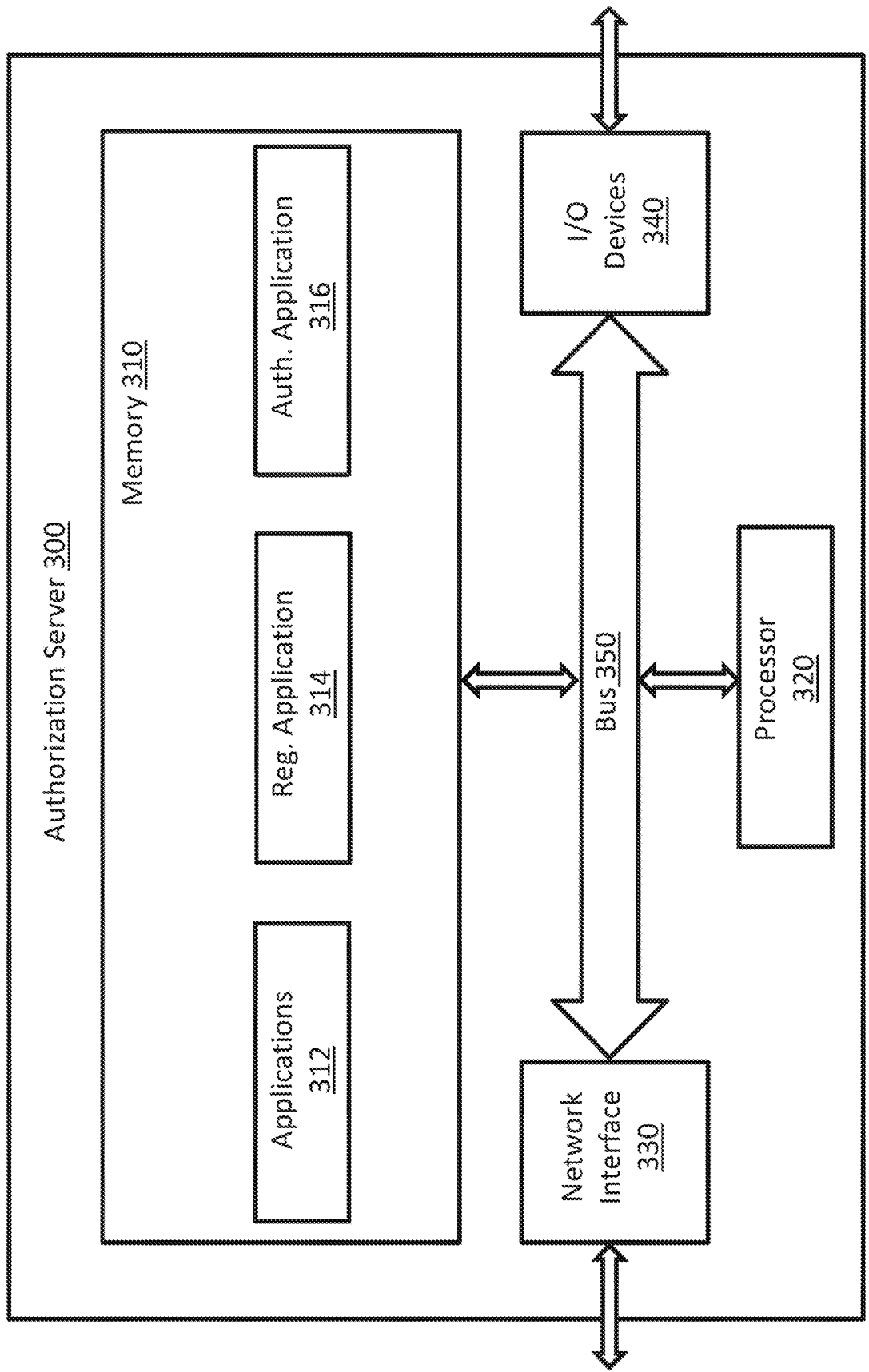

FIG. 3 schematically illustrates an example authorization server.

Figure 4:
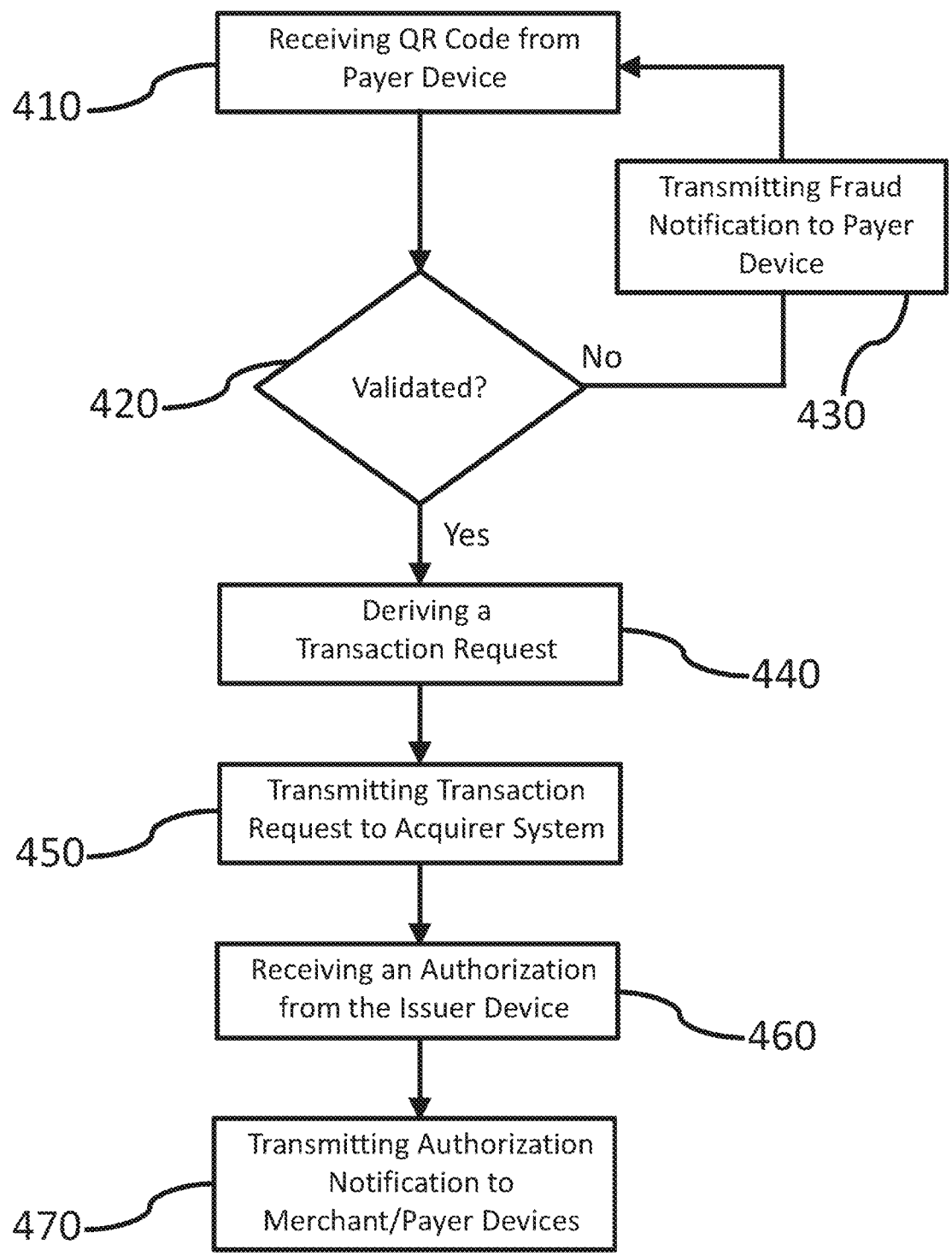

FIG. 4 illustrates an example flow of an authorization server method.

Figure 5:
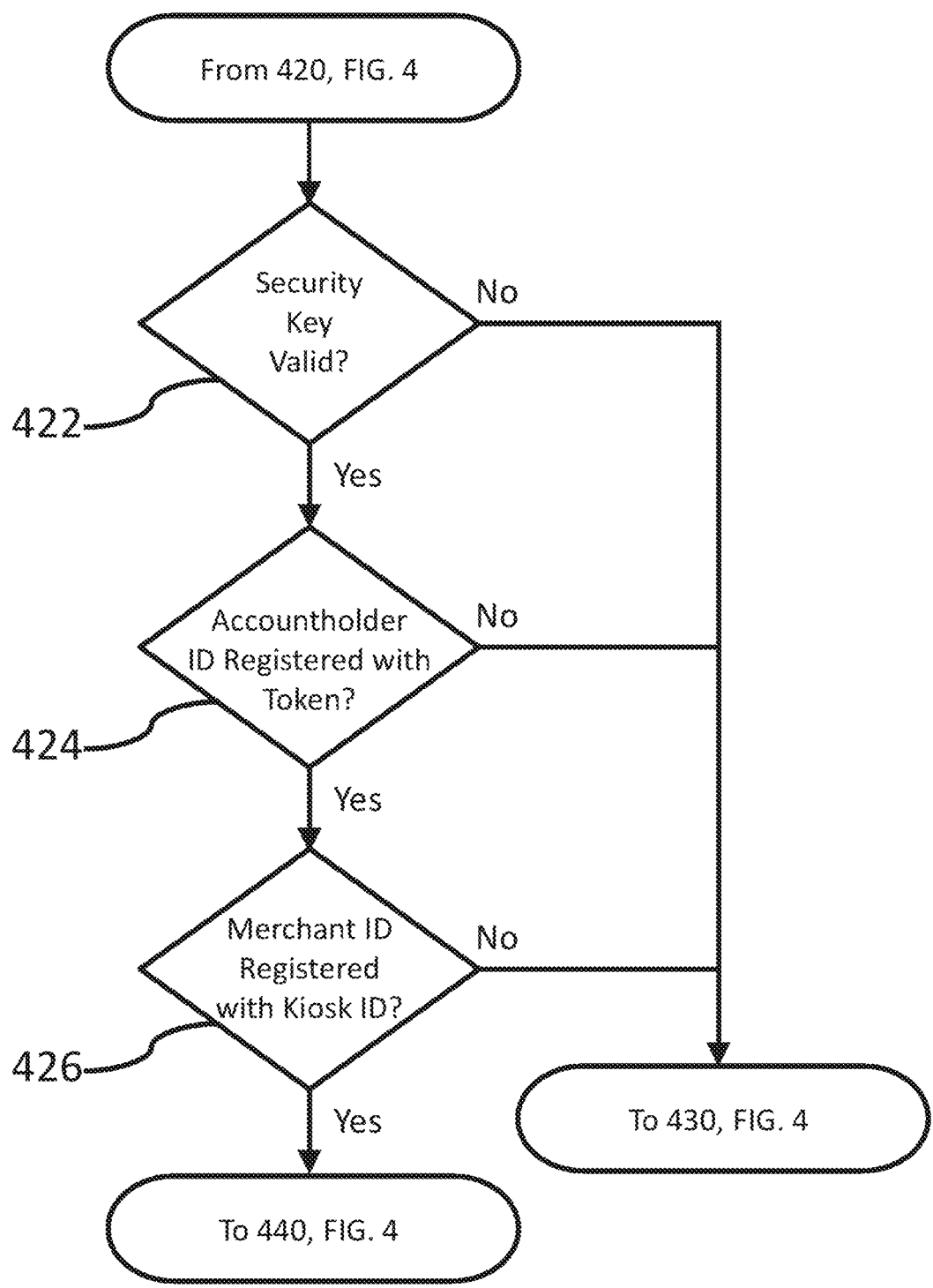

FIG. 5 illustrates an example flow detail of the method of FIG. 4.

Figure 6:
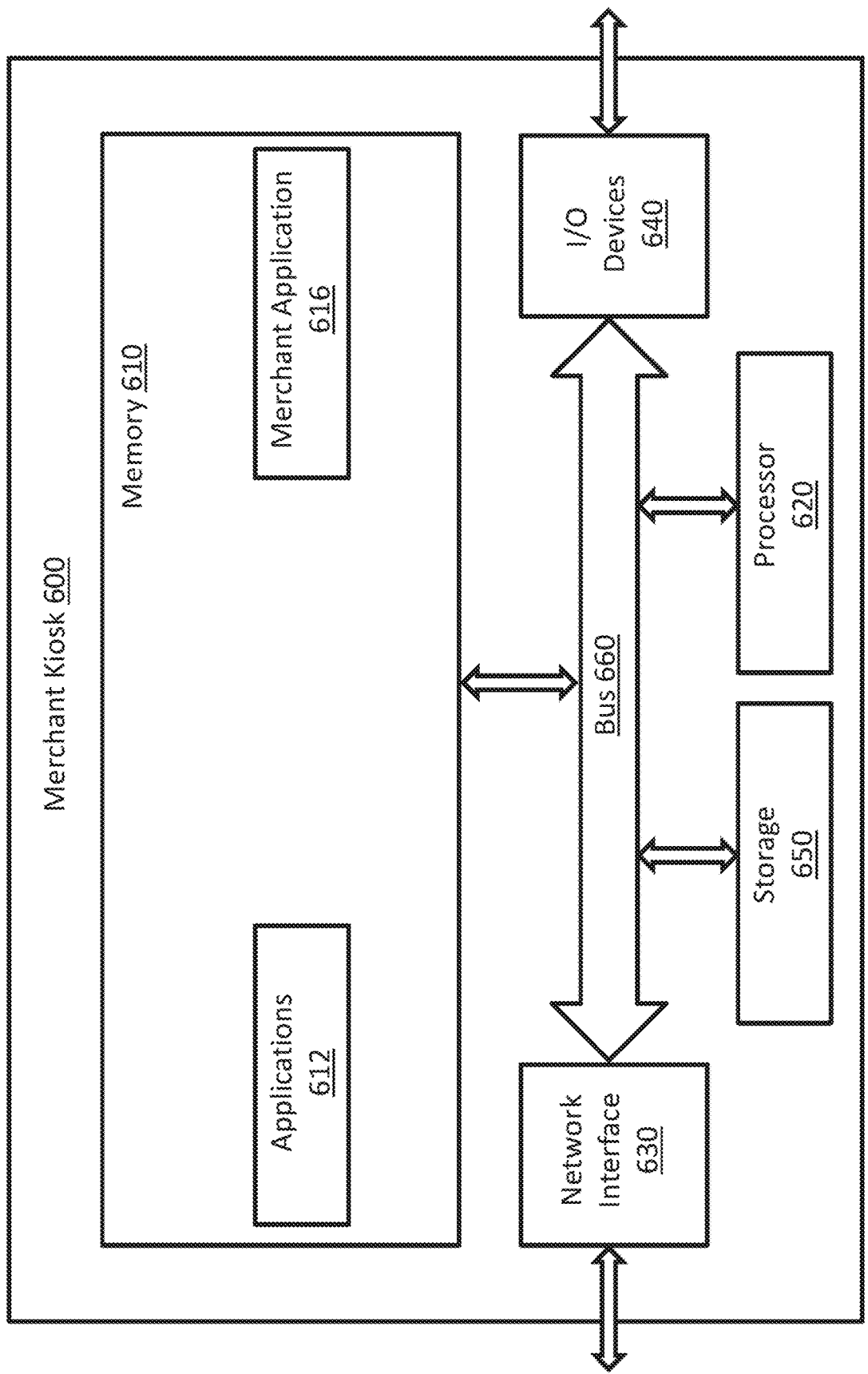

FIG. 6 schematically illustrates an example merchant kiosk.

Figure 7:
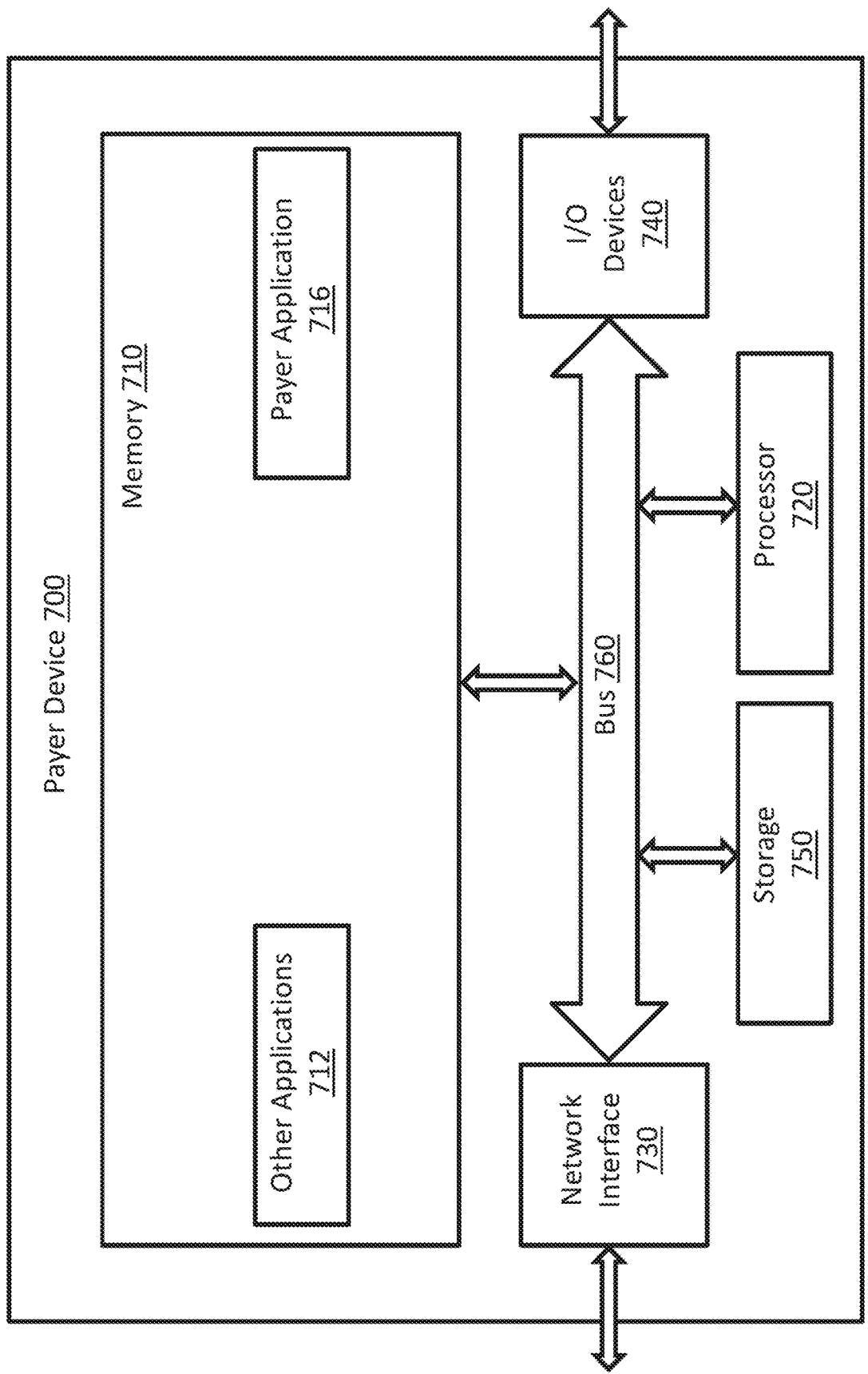

FIG. 7 schematically illustrates an example payer device.

Figure 8:
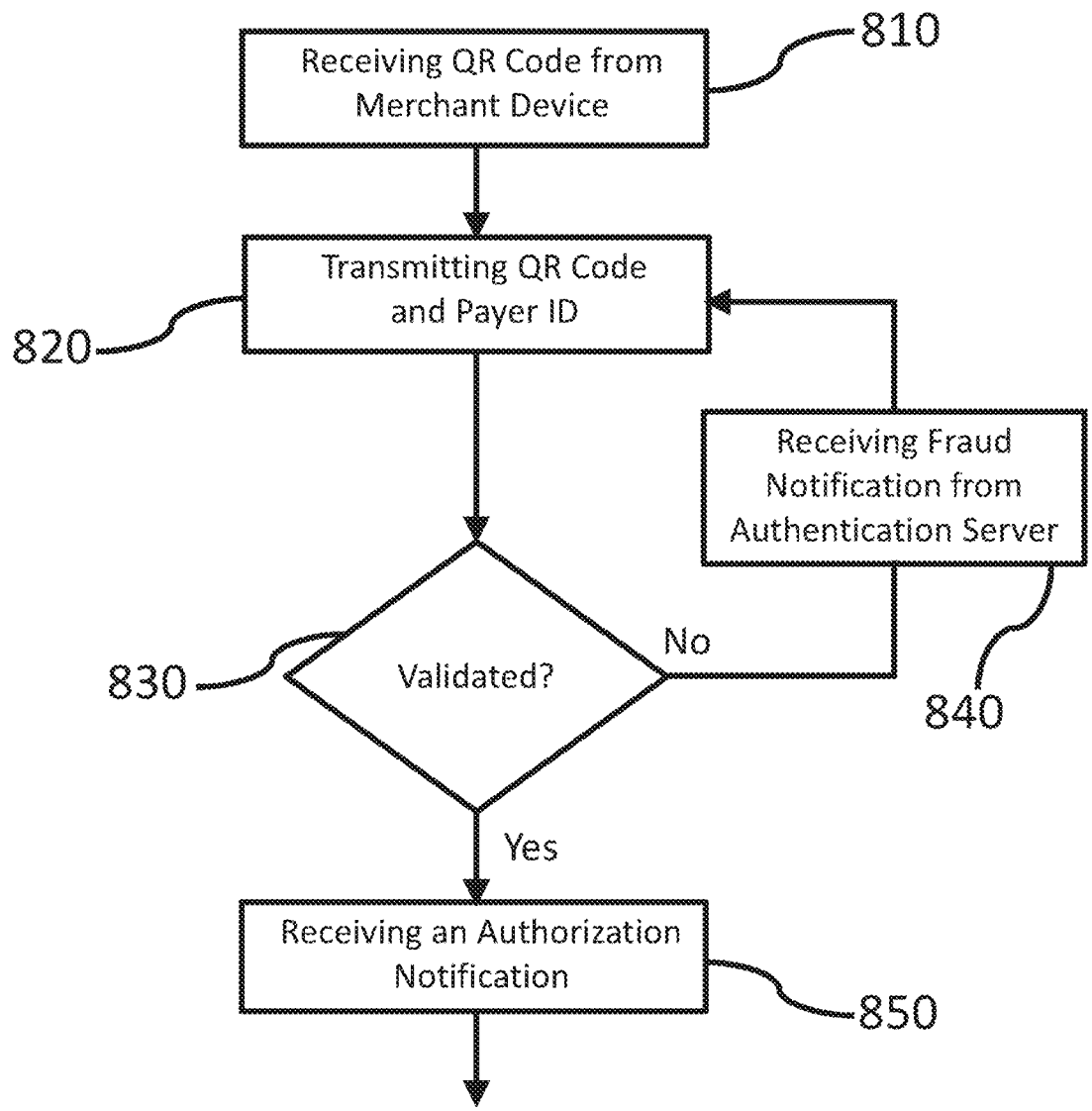

FIG. 8 illustrates an example flow of a method for transaction validation.

Figure 9:
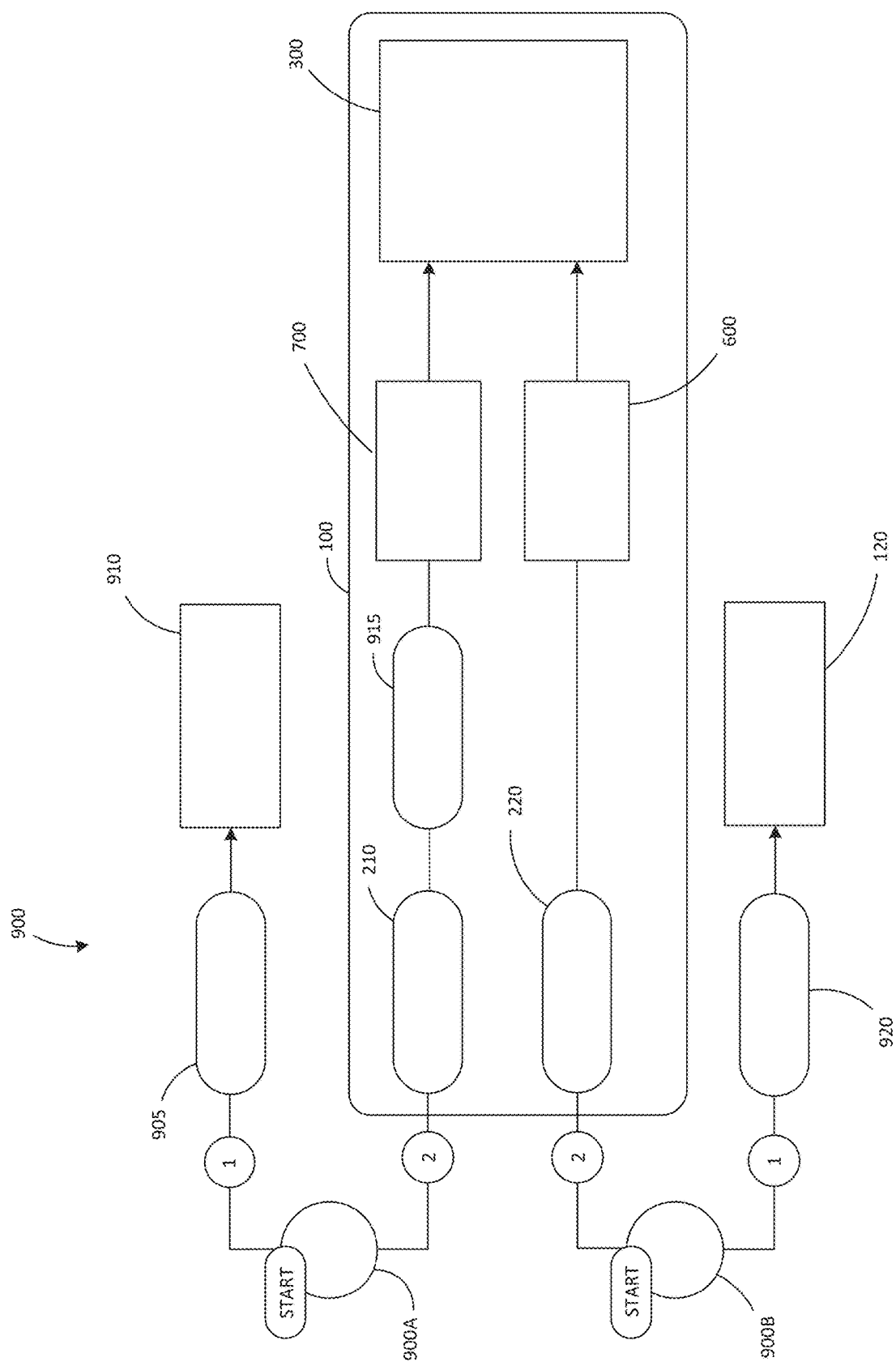
FIGS. 9-14 are new and FIGS. 1-8 were previously disclosed. The summary above, as well as the following detailed description of illustrative embodiments, is better understood when read in conjunction with the appended figures. For the purpose of illustrating the present disclosure, example constructions of the disclosure are shown in the figures. However, the present disclosure is not limited to specific methods and instrumentalities disclosed herein. Moreover, those having ordinary skill in the art will understand that the figures are not to scale. Wherever possible, like elements have been indicated by identical numbers.

FIG. 9 illustrates example registration scenario operations of an exemplary payer device, merchant device and authorization server.

Figure 10:
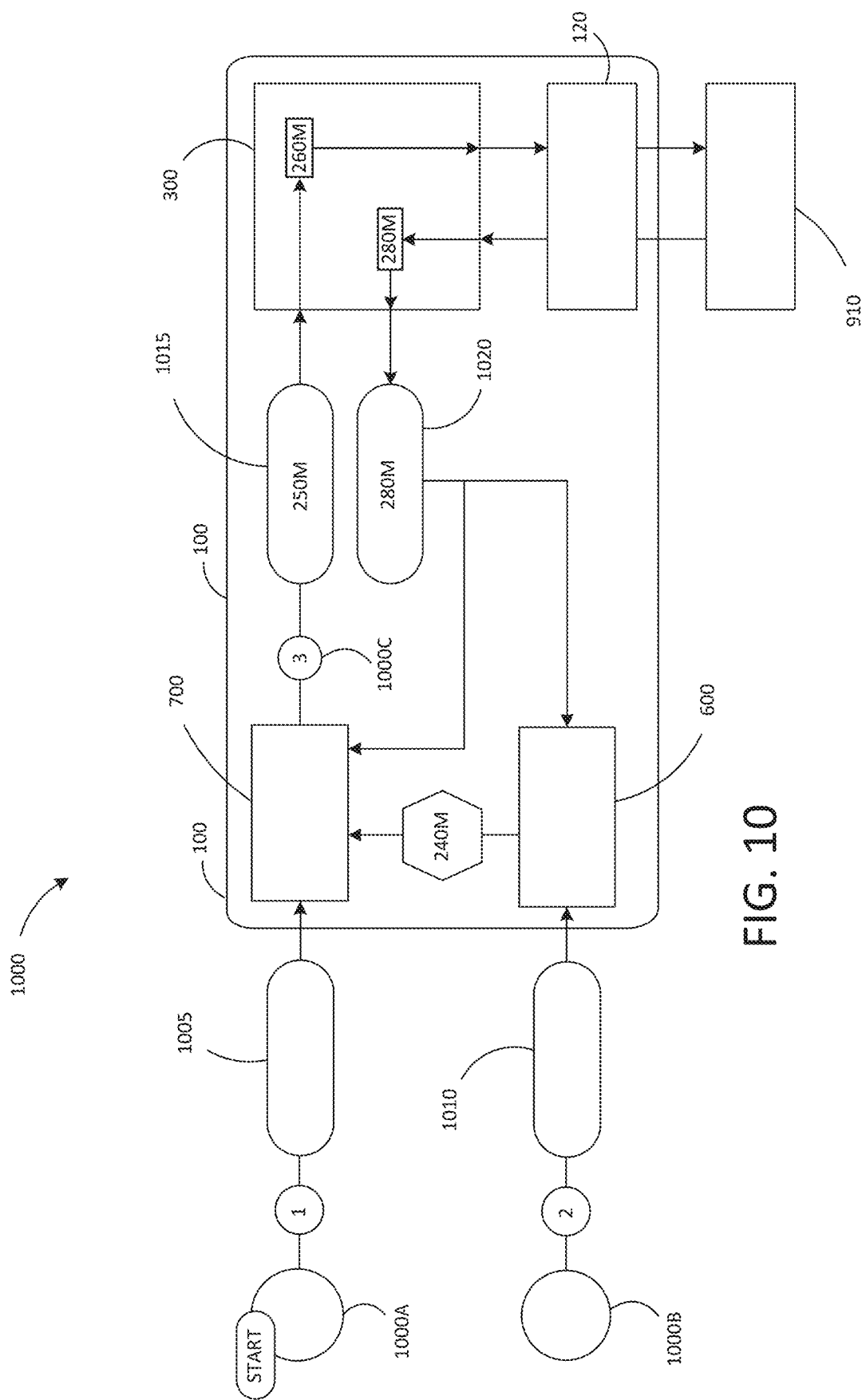

FIG. 10 illustrates example transaction scenario operations of an exemplary payer device, merchant device and authorization server.

Figure 11:
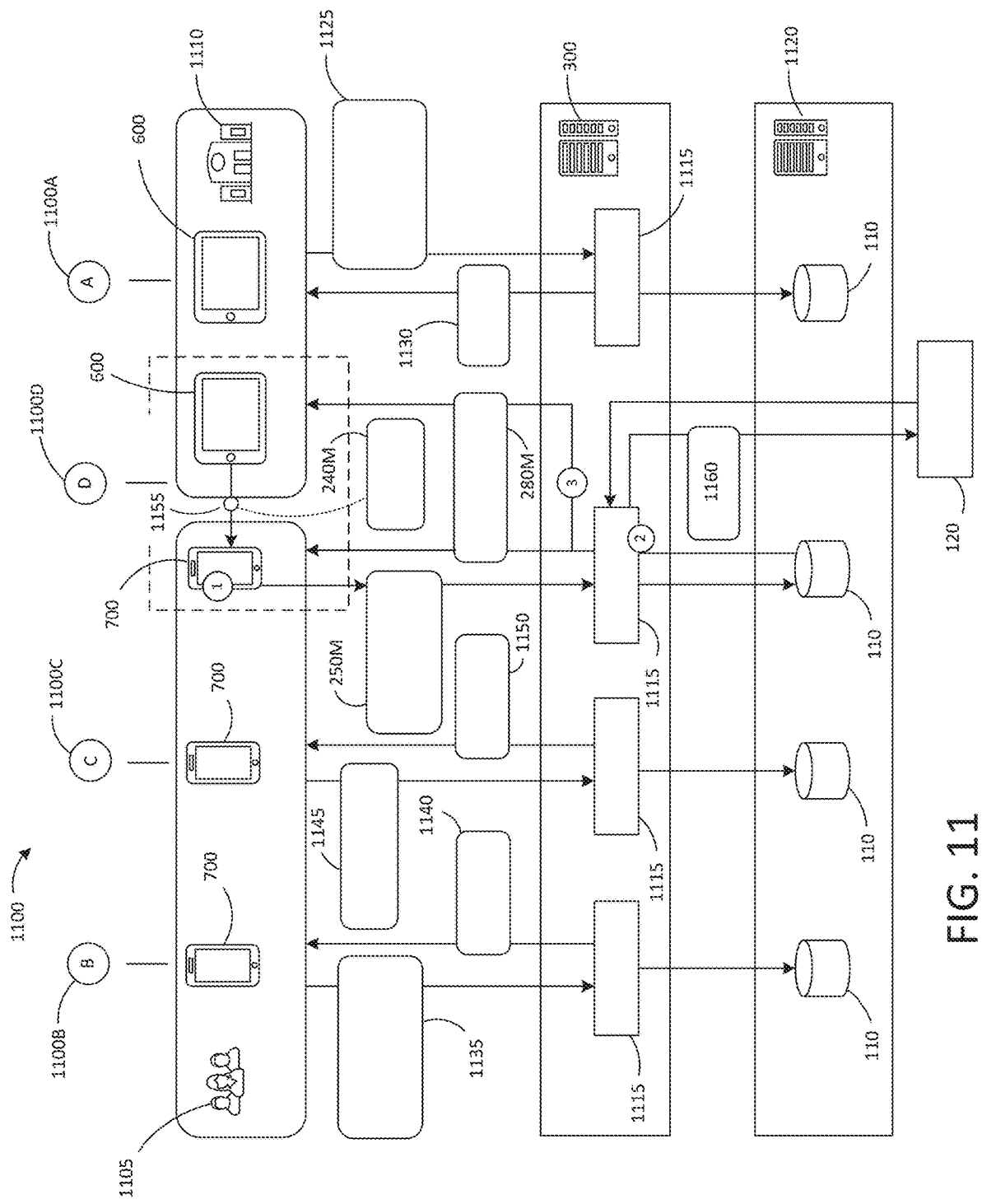

FIG. 11 illustrates example data flow design of an exemplary payer device, merchant device and authorization server for exemplary payer-controlled scenarios.

Figure 12:
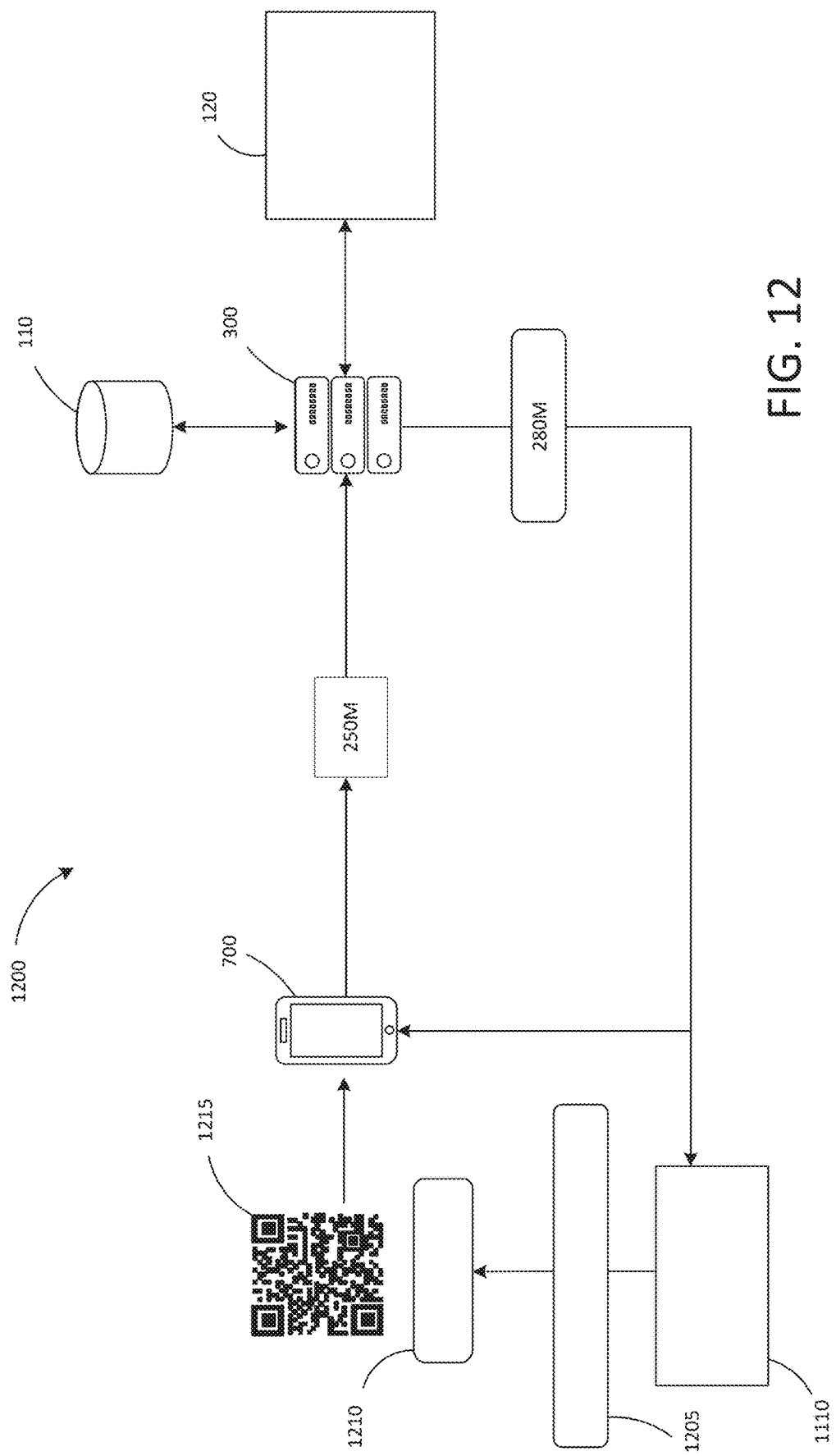

FIG. 12 illustrates example operations of an exemplary payer device, merchant device and authorization server for exemplary one-touch scenarios.

Figure 13:
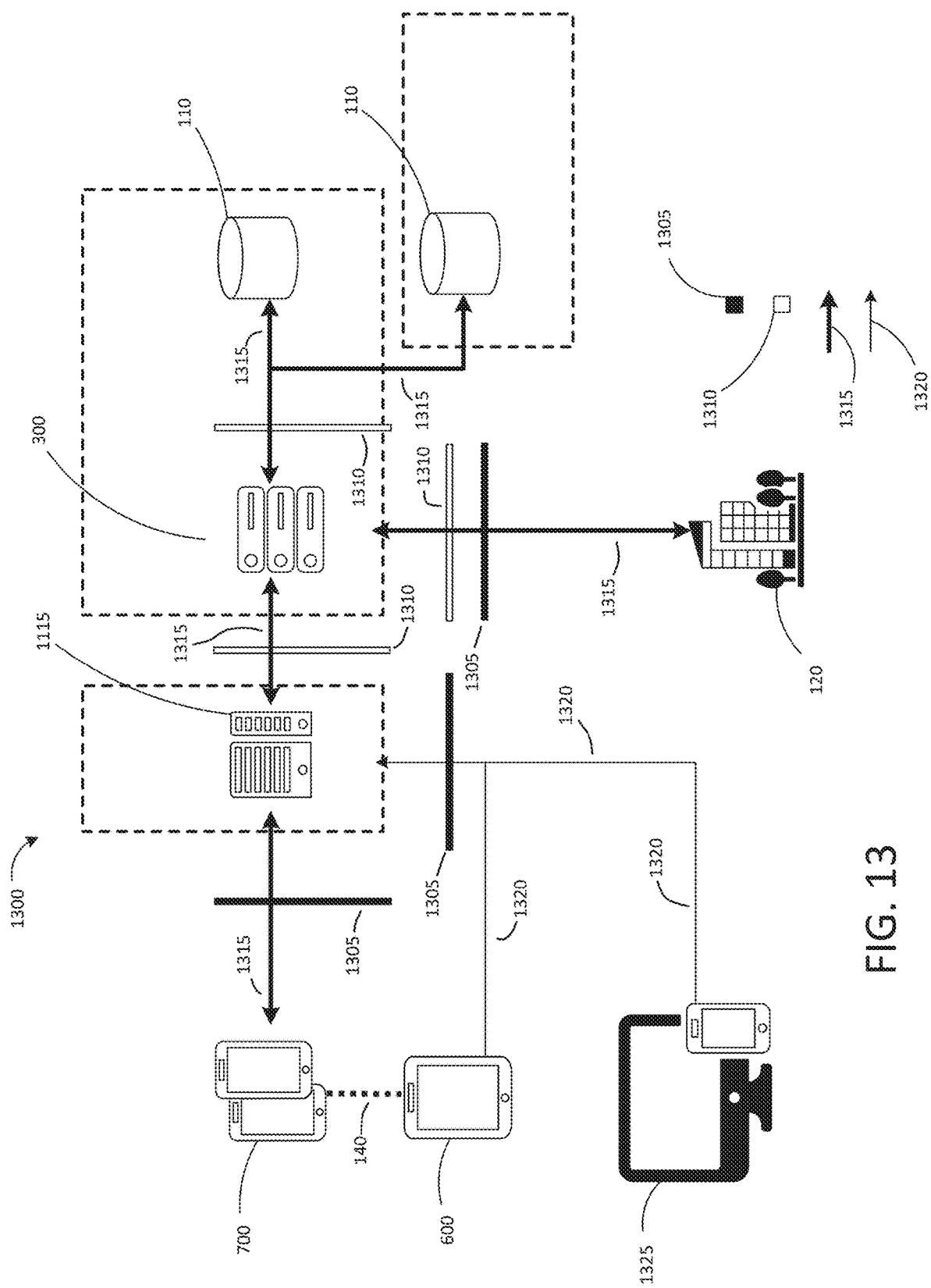

FIG. 13 illustrates an example operating environment of an exemplary payer device, merchant device and authorization server for exemplary one-touch scenarios.

Figure 14:
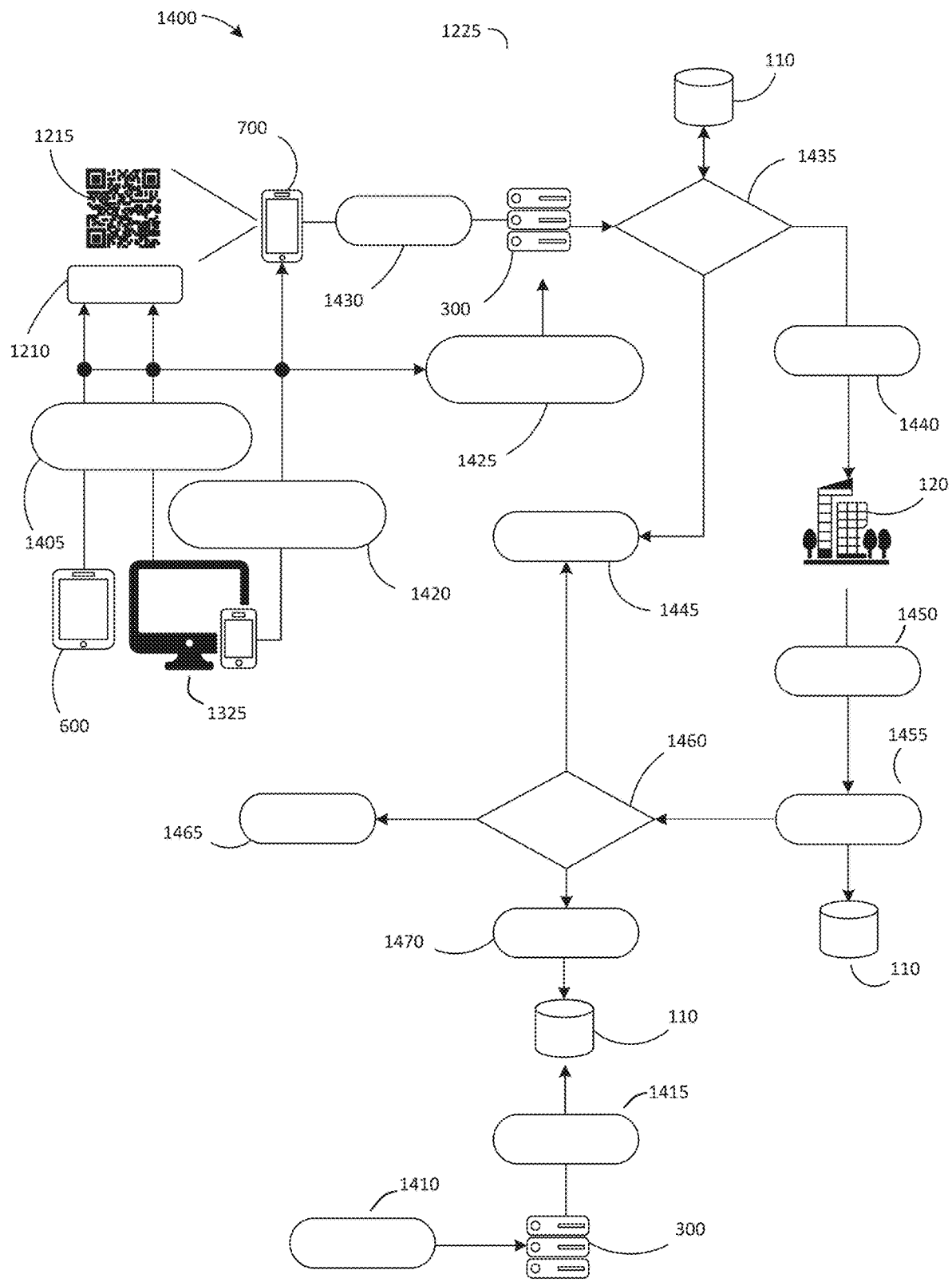

FIG. 14 illustrates an example process flow of an exemplary payer device, merchant device and authorization server for an exemplary one-touch scenario.

DETAILED DESCRIPTION

The following detailed description illustrates embodiments of the present disclosure and manners by which they can be implemented. Although the best mode of carrying out the present disclosure has been disclosed, those having ordinary skill in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

As used herein the term "consumer" should be understood as synonymous and interchangeable with the term "payer."

As used herein the term "push transaction" should be understood as synonymous and interchangeable with the term "push sale."

Smartphones and similar devices may be used as a means for initiating payments. An electronic wallet provides credit card or debit card information or other account information to a merchant for approval. The payer, who may also be an accountholder and/or cardholder, is required to authenticate use of the wallet via fingerprint or passcode and a transaction authorization is secured from the account- or card-issuing bank. Account information and other data may be encrypted or masked but it is nevertheless vulnerable during transmission. Almost all credit/debit card information is accessed and stolen somewhere along the chain of the transaction process.

Systems and methods in accordance with the disclosure take the standard electronic payment process and completely reverse it while also removing the element of transmitting any account data in any form to the merchant or merchant's payment processor or acquirer. Further disclosed systems and methods regulate entry of participants such as merchants to an otherwise closed payment system. Problems of the prior art are eliminated, or at least partially addressed, enabling completion of transactions without transmitting any information to the merchant, except for transaction approval notification. Completion of transactions without transmitting any information to the merchant except transaction approval notification, may be a result of an exemplary distributed payer-controlled payment architecture comprising at least a payer device, a merchant device and an authorization server, individually and collectively programmed and configured in accordance with the present disclosure. For example, the payer device, the merchant device and the authorization server may be individually and collectively programmed and configured to collaborate in unconventional distributed operations directed to completing payer-initiated transactions with a merchant without transmitting any information to the merchant except transaction approval notification. These unconventional distributed operations eliminate any possibility of stealing payer information, such as but not limited to, payer account and payer identity information, from the electronic transaction chain with the merchant. For example, an exemplary distributed payer-controlled payment architecture, as shown in FIG. 1, comprises a payer device, a merchant device and an authorization server individually and collectively programmed and configured to respond to payer initiation of a transaction by receiving, from the payer device: merchant identification, kiosk identification identifying a merchant kiosk, a security key and transaction information transmitted to the payer device from the merchant device registered with the merchant identification and payer identification that is associated with the payer device; validating the merchant identification, the kiosk identification, the payer identification and the security key when 1) the merchant identification is registered with the kiosk identification in an authorization database, 2) the payer identification is registered with a payer token in the authorization database, and 3) the security key is valid; deriving a transaction request from the 1) validated merchant identification, 2) validated payer token with which the payer identification is registered, and 3) transaction information; and for a transaction referenced by the transaction information received by the payer device from the merchant device, receiving, from an acquirer system, an authorization report based upon the transaction request, thereby illustrating unconventional operations using a distributed payer-controlled payment architecture. A reduction of account information theft, and, as adopted, elimination of onerous compliance issues for merchants are also enabled. By removing sensitive payer data such as account information and/or card numbers from the electronic transaction chain, there is nothing to steal.

A general overview description of disclosed systems and methods will be given, followed by more detailed descriptions.

A payer application functions both to verify who the payer is and approve the transaction, for example, authorizing an acquirer to pay the merchant on the payer's behalf using payer's funds or credit. A merchant application verifies the merchant and where the transaction funds will be sent as well as the transaction amount. The net result is a closed transaction circle without the need to transmit sensitive data.

The payer may activate the application on his or her device, for example, using a passcode and/or a biometric authentication such as a fingerprint when he/she is ready to pay. Activating the application prepares the payer device to receive an encrypted message from the merchant, containing merchant ID and transaction information.

The merchant may enter the amount of the transaction on his or her device using the merchant application and send the encrypted message to the payer who then approves the transaction and sends associated information on to system servers.

Once received, the authorization is processed with a card issuing bank, an acquirer and/or card networks and an encrypted authorization is transmitted through the applications to both the payer and merchant.

Both the payer and the merchant may receive an encrypted approval code, and the transaction is complete.

Never is any credit or debit card information transmitted during a transaction.

Additional aspects, advantages, features and objects of the disclosure will be made apparent from the figures and the detailed description of the illustrative embodiments construed in conjunction with the appended claims that follow. It will be appreciated that features of the disclosure are susceptible to being combined in various combinations without departing from the scope of the disclosure as defined by the appended claims.

FIG. 1 schematically illustrates the exemplary distributed payer-controlled payment system architecture 100 in a network environment suitable for practicing methods, systems and computer program products for payment authorization and for supporting payer-controlled payment processing services.

The example network environment includes one or more data processing systems, for example, in the form of a payer device 700, a merchant kiosk 600 and an acquirer system 120. The network environment also includes an authorization server 300, a database 110 associated with authorization server 300 and a communication network 130.

Communication network 130 generally includes a network of one or more communication links and two or more nodes that pass messages from one part of the network to another part. Each node has one or more pieces of electrical machinery, and each link may include one or more of optical fibers, optical links, radio links, electrical wires.

The network environment may be implemented in various ways, depending on various possible scenarios. In one example scenario, the network environment may be implemented by way of a spatially collocated arrangement of server and database. In another example scenario, the network environment may be implemented by way of a spatially distributed arrangement of server and database coupled mutually in communication via the communication network 130. In yet another example scenario, server and database may be implemented via cloud computing services.

The data processing systems such as payer device 700, merchant kiosk 600 and acquirer system 120 are coupled in communication with authorization server 300 via communication network 130. Communication network 130 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

During registration, authorization server 300 is configured to receive account information and other registration information from payer device 700 through communication network 130 and to receive account information and other registration information from merchant kiosk 600 through communication network 130. During registration, authorization server 300 is further configured to forward, through communication network 130, account information that has been associated with a token to acquirer system 120 for account confirmation. During registration, the authorization server 300 is configured to receive account confirmation from acquirer system 120 through communication network 130 for either the payer or the merchant.

During authorization, through communication network 130, authorization server 300 is configured to receive data from payer device 700 and approval codes from acquirer system 120. During authorization, through communication network 130, authorization server 300 is configured to send approval codes or fraud notifications/warnings to payer device 700 and/or merchant kiosk 600.

In an example, payer device 700 and merchant kiosk 600 are mutually coupled in communication through means other than communication network 130 including but not limited to wireless connection, paired connection, peer-to-peer connection, wired connection, airdrop, a virtual private network (VPN) 140 tunnelling through communication network 130 or a communication network (not shown) independent from communication network 130.

The network environment is suitable for implementing various systems for payment authorization and, in a particular example, payer-controlled payment authorization. In order to implement a system for payment authorization, server 300 provides a payment authorization service to payer device 700, merchant kiosk 600 and acquirer system 120, while authorization database 110 stores data related to the payment authorization, transactions, merchants, payers, accountholders, cardholders, etc. In an example, neither authorization server 300 nor authorization database 110 stores payer account numbers, account information, card numbers or card information usable by entities unregistered within records of authorization server 300 and/or authorization database 110.

Payer device 700 and merchant kiosk 600 may access authorization server 300 to download one or more software products associated with the payment authorization service, for example, during a registration process. In an example, such a software product may not be downloaded by merchant kiosk 600 unless approved by authorization server 300 based upon one or more account confirmation analyses. In one embodiment, payment authorization systems are arranged in a manner that functionality is implemented partly in payer device 700 and merchant kiosk 600 and partly in authorization server 300.

Payer device 700 and merchant kiosk 600 may be coupled to authorization server 300 periodically or randomly from time to time, for example, to receive updates therefrom and/or to upload status thereto.

Users associated with payer device 700 and merchant kiosk 600 use the payment authorization service. Accordingly, payer devices 700 may be used, operated, or carried by payers, accountholders or cardholders, while merchant kiosks 600 may be used, operated, or carried by merchants, merchant employees or other entities.

Authorization server 300 may store registration information, transaction requests, merchant identification, authorization and/or approval codes in authorization database 110. Payer identification as well as payer tokens may also be stored by authorization server 300 in authorization database 110. In an example, each of several payer tokens linked with a given payer in authorization database 110 is associated with a separate account of that payer. Moreover, authorization database 110 includes a non-transient data storage medium. Additionally or alternatively, various data may be stored in a relational database accessible to authorization server 300.

Payment authorization services implemented through the network environment can be offered free of cost or can be a paid service that has a subscription-based billing or a transaction-based billing, such as pay-per-use and pay-per-feature.

The network environment is described as an example and is not to be construed as limiting the network environment to specific numbers, types, or arrangements of data processing units, data processing systems, servers, databases and communication networks. A person skilled in the art will recognize many variations, alternatives, and modifications of embodiments of the disclosure.

FIG. 2 is an illustration of actions of an example method for payment authorization, in accordance with an embodiment of the disclosure and suitable for providing a payer-controlled payment processing service. The method is depicted as a collection of actions in a logical flow diagram, which represents a sequence of actions that may be computer-implemented such as in hardware, software, or a combination thereof.

During an initialization or registration phase, a payer device which may also be a cardholder device or an accountholder device is registered with a payer identification and a payer account. In an example, a credit card number or account number may be received from the payer device and associated with the payer account. In another example, the credit card or account number is deleted after being associated with the payer account.

A payer may use a data processing system such as a payer device 700 to download a payer application and register the application through the device to pair the device with a particular payer at 210. As set forth above, authorization server 300 receives account confirmation from acquirer system 120 through communication network 130 for the payer. At 220, a merchant may file for approval to register as a merchant for the payment processing service. As set forth above, authorization server 300 receives account confirmation from acquirer system 120 through communication network 130 for the merchant. Upon receipt of the appropriate confirmation, the merchant may download a merchant application with a merchant data processing system such as a merchant kiosk 600. The merchant application, merchant kiosk 600 and the merchant are thereby associated together.

Actions 210 and 220, in particular, may occur in a different order from that shown by way of example in FIG. 1 and the order has no bearing on the ability of following actions to be performed except that one or more of actions 230-280 may depend on actions 210 and/or 220, regardless of order. In operation, there is ongoing registration from both payers and merchants and any number of payers or merchants may register.

The payer may activate the application at 230, for example, using a passcode and/or a biometric authentication when he or she is ready to pay. Activating the application prepares payer device 700 to receive from the merchant by way of merchant kiosk 600, an encrypted message. The encrypted message may contain identifying merchant information, transaction information, a merchant IP address, a security key or any combination of these. The payer device 700 may be configured to receive the encrypted message from the merchant kiosk 600 via the VPN 140. Transaction security may be improved, and the probability of fraud reduced by communicatively coupling the payer device 700 and the merchant kiosk 600 via the VPN 140 which may be configured to provide a secure communication channel independent from the communication network 130. It will be appreciated from at least FIG. 1 that the secure communication channel provided by the VPN 140, communicatively couples only payer device 700 and merchant kiosk 600. In view of the disclosure herein, it will be understood by one of ordinary skill in the art, that the secure communication channel provided by the VPN 140 is dedicated exclusively to communication between an exemplary payer device 700 and an exemplary merchant kiosk 600 during payer initiation of a transaction phase after a previous registration phase. For example, the encrypted message received by the payer device 700 from the merchant kiosk 600 via the VPN 140 during the payer-initiated transaction phase may comprise identifying merchant information, transaction information, a merchant IP address, a security key and/or any combination of these, wherein the merchant kiosk 600 received the security key from the authorization server 300 during a registration phase prior to the transaction phase. Transaction security may be further improved, and the probability of fraud further reduced with the additional layer of security and authentication provided by the VPN 140 configured between the merchant kiosk 600 and the payer device 700. For example, persons of ordinary skill would recognize the merchant kiosk 600 and payer device 700 communication endpoints would be authenticated and, the merchant information, transaction information and security key received by the payer device 700 from the merchant kiosk 600 would be further protected by the additional layer of cryptographically secure authentication and encryption functions of the VPN 140. Persons of ordinary skill would recognize the additional layer of cryptographically secure authentication and encryption functions of the VPN 140 enhance the security of communication between the payer device 700 and the merchant kiosk 600 to further protect the merchant information, transaction information and security key received by the payer device 700 from the merchant kiosk 600 before the merchant information, transaction information and security key are forwarded by the payer device 700 to the authorization server 300 for further validation in accordance with the disclosure herein. This enhanced security and authentication provided by the VPN 140 configured between the merchant kiosk 600 and the payer device 700 may prevent an attacker from capturing useful communication between the merchant kiosk 600 and the payer device 700. The VPN 140 configured between the merchant kiosk 600 and the payer device 700 may prevent an attacker from using captured communication between the merchant kiosk 600 and the payer device 700 in a replay attack. The VPN 140 configured between the merchant kiosk 600 and the payer device 700 may prevent an attacker from maliciously injecting a fraudulent transaction into the distributed payer-controlled payment system 100. For example, persons of ordinary skill would understand the VPN 140 provides a secure connection configured between the merchant kiosk 600 and the payer device 700 to prevent a malicious actor from successfully using, in a replay attack for example, captured network communication comprising transaction information sent by merchant kiosk 600 to payer device 700, and fraudulently injecting a malicious transaction in the replay attack. Persons of ordinary skill would recognize the VPN 140 secure connection configured between the merchant kiosk 600 and the payer device 700 would eliminate any reasonable possibility an attacker could capture useful network traffic from that communication link, that might be useful in a replay attack or other types of attacks known to persons of ordinary skill in the field of communication security. In another illustrative example, the authorization server 300 may be configured to terminate a transaction and send a warning upon determining any of the merchant information, transaction information or security key, received in the encrypted message from merchant kiosk 600 by the payer device 700 via the VPN 140 and forwarded to the authorization server 300 by the payer device 700, are not valid, in accordance with the present disclosure. Persons of ordinary skill would understand the VPN 140 secure connection configured between the merchant kiosk 600 and the payer device 700 improves the security of the distributed payer-controlled payment system 100 for at least the reasons above.

After the payer requests to make a purchase at a merchant point of sale, the merchant presents identifying and/or transaction information and the security key to payer device 700 at 240. Payer device 700 reads the identifying and/or transaction information and the security key from merchant kiosk 600 and sends at least a portion thereof in a secure manner (e.g., in an encrypted form) to authorization server 300. Reading the information may be performed by scanning a bar code or QR code with image-capturing tool such as a camera or by receiving a code transmitted wirelessly using one or more near-field communications beacons or tags or by wired connection from merchant kiosk 600 via the VPN 140, depending on the type of transaction for example, online, physical point of sale, wireless, mail order or telephone order. It will be understood by one of ordinary skill in the art that the payer device 700 may be configured to read the identifying and/or transaction information and the security key from the merchant kiosk 600 using at least one of: the VPN 140, an image-capturing interface comprising a camera, or a near-field communication interface comprising one or more near-field communications beacons or tags, depending on the type of the transaction initiated by the payer. It will be further understood by the disclosure herein, as well as one of ordinary skill in the art, that the payer device 700 may be configured to use at least the VPN 140 to receive the encrypted message from the merchant if the type of the transaction is online; use at least the image-capturing interface to receive the encrypted message from the merchant if the type of the transaction is physical point of sale; and/or use at least the near-field communication interface to receive the encrypted message from the merchant if the type of the transaction is wireless.

In an example, one or more of the identifying information, the transaction information and the security key are presented by the merchant by one or more near-field communications beacons or tags. For example, the payer may scan or otherwise select one or more goods or services for purchase and receive merchant and transaction information from a beacon or tag and automatically pay as each good or service is identified or at the time of leaving a physical point of sale.

In each of the above implementations, payer device 700 does not need to provide payment information to merchant kiosk 600. Instead, once a purchase request has been made to the merchant, the identifying and/or transaction information and the security key may be presented to payer device 700, for example, in the form of a QR code. Once the identifying and/or transaction information is received, the payer may commit to the purchase and complete the transaction by clicking on a "Confirm" button of a payer application of payer device 700. In an example, the payer may use a passcode and/or a biometric authentication at the time of confirmation.

After a payer commits to the purchase transaction, the method for payment authorization, includes receiving, at 250, from a payer device registered with a payer identification, merchant identification and transaction information transmitted, at 240, to the payer device from a merchant device registered with the merchant identification and the payer identification. In an example, the payer identification is received from the payer device without receiving payer account information. In another example, the payer identification is received from the payer device without receiving the payer identification from the merchant device. In yet another example, the payer identification is received from the payer device without receiving payer account information and without receiving the payer identification from the merchant device.

Authorization server 300 preferably validates the identifying and/or transaction information and the security key and securely forwards a transaction request to an acquirer system, to be used in a purchase transaction if the identifying and/or transaction information is validated. Authorization server 300 preferably applies one or more validation tests to the information to obtain a level of confidence that both the merchant and the payer are registered for the transaction authorization service. When the one or more validation tests are passed, and preferably with no tests being failed, authorization server 300 forwards a representation of the identifying and/or transaction information on to acquirer system 120 which may include a payment processing network.

In some implementations, authorization server 300 receives information that identifies a merchant (the "merchant identification information" or "merchant identifier") from payer device 700 along with the identification information for payer device 700, and, if valid, securely sends, at 260, the merchant identification, the kiosk identification, a security key, the transaction information, and the payer identification to acquirer system 120. This is known as a transaction request. In an example, authorization server 300 may securely send IP addresses for the merchant and the payer.

Depending upon implementations, the data representative of the identification information sent to acquirer system 120 by authorization server 300 may comprise a portion or all of the received and verified identification information, or may comprise a substitute account number, account name or payer token that is used for the payer in place of the card holder name, card number, payer identification and/or account number in interactions between authorization server 300 and acquirer system 120. The card number sent to the acquirer system 120 may be a tokenized card number.

In an example, deriving the transaction request further includes, with the payer identification, retrieving a payer account associated with the payer identification. In an example, deriving the transaction request further includes, with the payer identification, retrieving a payer token associated with the payer identification. In another example, deriving the transaction request further includes assembling the merchant identification, the transaction information and the payer token into the transaction request. In yet another example, deriving the transaction request further includes assembling the transaction information and the payer token into the transaction request without including an account number.

Acquirer system 120 can then perform the actions normally performed to authorize the transaction, such as checking whether the merchant is in good standing, and checking the account limit of the payer to ensure that there are sufficient funds to cover the purchase price of the transaction. The method further includes receiving, at 270, an authorization from acquirer system 120 for a transaction referred to by the transaction information and/or the transaction request.

The method may further include looking up, by acquirer system 120, a payer account number, or card number based upon the transaction request and/or the payer token.

The method further includes, at 280, transmitting transaction approval codes for the transaction to the merchant device based upon the authorization. In an example, the method further includes transmitting transaction approval codes for the transaction to the payer device.

The method may further include transferring funds in an amount reflected by the transaction request from the account of the payer to an account of the merchant when a limit associated with the account of the payer represented with the payer token is equal to or greater than an amount reflected in the transaction request.

The actions described with reference to FIG. 2 are only illustrative and other alternatives can also be provided where one or more actions are added, one or more actions are removed, or one or more actions are provided in a different sequence without departing from the scope of the claims herein.

FIG. 3 schematically illustrates an example authorization server suitable for performing disclosed payment authorization methods as part of a payment authorization system. Authorization server 300, in accordance with an embodiment of the disclosure includes, but is not limited to, a memory 310, computing hardware such as a processor 320, Input/Output (I/O) devices 340, a network interface 330, and a system bus 350 that operatively couples various components including memory 310, processor 320, I/O devices 340 and network interface 330. Authorization server 300 also includes a power source for supplying electrical power to the various components of authorization server 300. The power source may, for example, include a rechargeable battery.

Memory 310 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 310 stores a registration application 314, an authentication application 316 and a variety of other applications 312. Registration application 314, authentication application 316 and other applications 312 may include software products having computer-readable instructions causing authentication server 300 to perform various tasks. In the case of the registration application 314 and the authentication application 316, the software products and/or computer-readable program products are associated with the payment authorization service provided by server 300. Executing software products on processor 320 causes processor 320 to perform various actions of disclosed payment authorization methods.

Registration application 314 configures authorization server 300 to receive payer account information confirmation from acquirer system 120 and register the payer and or payer application with a payer device as set forth above in descriptions of FIG. 2. Further, registration application 314 configures authorization server 300 to receive merchant account information confirmation from acquirer system 120 and register the merchant and or merchant application with a payer device as set forth above in descriptions of FIG. 2.

I/O devices 340 may include a display screen for presenting graphical images to a user of authorization server 300. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on a display screen of I/O devices 340. The graphical user interface is configured to facilitate user interactions with the payment authorization server.

Additionally or alternatively, I/O devices 340 include a mouse or a joystick that is operable to receive inputs corresponding to clicking, pointing, and/or moving a pointer object on the graphical user interface. I/O devices 340 may also include a keyboard that is operable to receive inputs corresponding to pushing certain buttons on the keyboard. Additionally, I/O devices 340 may also include a microphone for receiving an audio input from the user, and a speaker for providing an audio output to the user.

The software products, when executed on processor 320, cause processor 320 and/or memory 310 to couple with authorization database 110 and are configured to substantially continuously record and update authorization, transaction requests and/or approval codes in authorization database 110. The software products, when executed on processor 320, are optionally configured to return authorization server 300 to its last updated status in authorization database 110, in case of interruptions in the operable state of authorization server 300 or its associated components.

Additionally, the software products, when executed on processor 320, may store registration information, transaction requests, merchant identification, payer identification, authorization and/or approval codes in authorization database 110.

Furthermore, network interface 330 optionally allows authorization server 300 to receive registration information, transaction requests, merchant identification, payer identification, security keys, authorization reports and to transmit transaction requests and authorization notices, for example, via communication network 130. Moreover, network interface 330 optionally allows authorization server 300 to communicate with other data processing systems, for example, via communication network 130.

Authorization server 300 is configured, for example by software products such as authorization application 316, to receive, from a payer device, merchant identification, kiosk identification identifying a merchant kiosk, a security key and transaction information transmitted to the payer device from a merchant device registered with the merchant identification and payer identification associated with the payer device. Authorization server 300 may be further configured to receive, from the payer device, other data including, for example transaction date and time, merchant IP address and/or payer IP address. Further, kiosk identification may include a device serial number associated with the kiosk.

Authorization server 300 may be configured to receive the payer identification directly from the payer device without receiving the payer identification from the merchant kiosk. In an example, authorization server 300 is configured to not receive any transmission directly from a merchant kiosk except during registration for use of disclosed payment processing services. In another example, authorization server 300 may be configured to refuse any direct transmission from any merchant kiosk except during registration.

The merchant identification, the kiosk identification, the security key, and the transaction information may be received by authorization server 300 packaged into a QR code or QR purchase code.

Authorization server 300 is further configured, for example by software products such as an authorization application 316, to validate the merchant identification, the kiosk identification, the payer identification and the security key when the merchant identification is registered with the kiosk identification in an authorization database, the payer identification is registered in the authorization database and the security key is valid.

Authorization server 300, for example by way of processor 320 and authorization application 316, is configured to derive a transaction request from the validated merchant identification, the payer identification and the transaction information. Authorization server 300 is configured to transmit the derived transaction request to an acquirer system. No payer ID or any payer data, including any payer account information is ever seen by the merchant device 600 or the merchant, not in any scenario. After merchant device 600 setup, the authorization server 300 interacts only with the payer device 700. Only during merchant device 600 setup can the merchant device 600 interact with the authorization server 300.

Authorization server 300 may be configured, for example by software products such as authorization application 316, to transmit a fraud notification to the payer device and/or the merchant kiosk when the merchant identification is not registered with the kiosk identification in an authorization database, the payer identification is not registered in the authorization database, the security key is invalid or any combination of these.

In an example, the payer identification is excluded from the derivation of the transaction request. Instead, the payer token registered with or otherwise associated with the payer identification in the authorization server database is included in the transaction request, offering an alternative manner of identifying the payer.

Authorization server 300 receives, for example through network interface 330 an authorization report for a transaction referred to by the transaction information based upon the transaction request. The authorization report may be sent from an acquirer system which has processed the transaction request from authorization server 300.

Authorization reports received by authorization server 300 may reflect an approval when a limit associated with an account matched with the payer token in a storage of the acquirer system is equal to or greater than an amount reflected by the transaction information. Correspondingly, authorization reports received by authorization server 300 may reflect a denial when a limit associated with an account matched with the payer token in a database of the acquirer system is less than an amount reflected by the transaction information.

Authorization server 300 may be configured for example by software products such as authorization application 316, to send an authorization notification to the merchant kiosk based upon the authorization report and send an authorization notification to the payer device based upon the authorization report. In an example, authorization notifications include approval codes including but not limited to approval codes received as part of the authorization report(s).

Authorization server 300 may be configured to not transmit account numbers and/or card numbers of the payer. In an example, neither account numbers nor card numbers of the payer may be in the possession of authorization server 300 during payment authorization services or associated transactions.

Authorization server 300 is optionally implemented by any of a variety of: a tablet computer, a PC, a laptop computer, a desktop computer and an NAS device.

FIG. 4 illustrates an example flow of an authentication server method. The method is depicted as a collection of actions in a logical flow diagram, which represents a sequence of actions that may be computer-implemented such as in hardware, software, or a combination thereof and may be suitable for providing a payer-controlled payment processing service. In an example, disclosed actions may be implemented, in part, by authorization server 300.

The method includes receiving from a payer device, at 410, merchant identification, kiosk identification identifying a merchant kiosk, a security key and transaction information all of which have been previously transmitted to the payer device from a merchant device registered with the merchant identification. Further, payer identification associated with the payer device is also received from the payer device. In an example, a date and/or time are also received from the payer device. The date and/or time may be provided by the merchant kiosk at the same time other transaction information is provided or may be determined in another manner. In another example the method includes receiving a merchant IP address and a payer IP address the payer device.

The merchant identification, kiosk identification, the security key, and the transaction information may be packaged into or otherwise represented in a single object, for example, a QR code or a transmitted code.

Again, because payer identification is transmitted by or received from the payer device, it is unnecessary that the payer identification be transmitted by or received from the merchant kiosk and, as such, in an example, the merchant and/or the merchant kiosk is/are not in possession of the payer identification.

The method further includes, at 420, validating the objects received from payer device 700. Authorization server 300 compares incoming objects it receives from payer device 700 (such as by looking at account numbers), and can match (e.g., correlate) incoming objects with validation information obtained during registration. For example, authorization server 300 may compare incoming codes with validation information.

FIG. 5 illustrates an example detail flow of the method of FIG. 4. The method is depicted as a collection of actions in a logical flow diagram, which represents a sequence of actions that may be computer-implemented such as in hardware, software, or a combination thereof. In an example, disclosed actions may be implemented, in part, by authorization server 300.

A primary validation test that authorization server 300 may apply pertains to verifying that the code is authentic. For this, authorization server 300 may have a database of security keys. The first validation test may include, at 422, checking that or determining whether one or more of the security keys validate the code. In an example, the security key is a base form, core or kernel of a general code which underlies all codes exchanged between merchants, payers and payment processing servers for the purposes of processing payments for transactions. If a code does not include the base form core or kernel, it will not be validated by any security keys and the first validation test may be deemed to have been failed. In an example, such validation tests may be applied to bar codes, QR codes and/or beacon-transmitted codes.

Secondary validation tests that authorization server 300 may apply pertain to verifying that transaction is authentic. For this authorization server 300 may also have a database of merchant IDs, kiosk IDs, payer identification and tokens, and can validate that the payer device has sent a merchant ID that is registered with the kiosk ID and a payer identification registered with one or more stored payer tokens. At 424, it is determined whether the payer identification is registered with a payer token in authorization database 110. It is determined, at 426, whether the merchant identification is registered with the kiosk identification in authorization database 110. Validation of transaction serves to authenticate the transaction. If a validation test is failed, authorization server 300 may record the identification of the failed merchant kiosk and the source IP address and/or MAC address from which the payer device made the request in a database.

While depicted as proceeding in a particular order, it should be noted that the validation actions 422, 424 and 426 may be performed in another order. Alternatively, actions 422, 424 and 426 may be performed simultaneously or substantially simultaneously. Nevertheless, if any of the individual validations or any combination thereof fails, at 430 (FIG. 4), a fraud notification may be transmitted to the payer device and/or the merchant kiosk.

Referring again to FIG. 4, when all relevant information is validated, a transaction request is derived from the validated merchant identification, the payer token with which the payer identification is registered and the transaction information for a transaction referred to by the transaction information, at 440.

At 450, the method may further include transmitting the transaction request to an acquirer system. In an example, the payer identification is not transmitted to or is otherwise withheld from the acquirer system. Instead, a payer token registered with or otherwise associated with the payer identification in authorization database 110 may be presented to the acquirer system, offering an alternative manner of identifying the payer. In a high security embodiment, neither account numbers, nor card numbers may be transmitted during the payment authorization method between any of the merchant kiosk, the payer device, the authorization server or the acquirer system. The authorization server 300 may be configured with payer Primary Account Number (PAN) data such as for example card numbers. The authorization server 300 may be configured to pass the payer PAN data to the acquirer system 120. The authorization server 300 may be configured with tokenized payer card number data. The authorization server 300 may be configured to pass only the tokenized payer card number data to the acquirer system 120.

At 460, an authorization report is received from the acquirer system based upon the transaction request. The received authorization report reflects approval when a limit associated with an account matched with the payer token in a database of the acquirer system is equal to or greater than an amount reflected in the transaction information. Correspondingly, the received authorization report reflects denial when a limit associated with an account matched with the payer token in a database of the acquirer system is less than an amount reflected in the transaction information.

At 470, the method may further include transmitting or otherwise sending an authorization notification to the merchant kiosk based upon the authorization report and/or sending an authorization notification to the payer device based upon the authorization report.

In an example, if the authorization report received by authentication server 300 reflects an approval, the authorization notification sent to the merchant kiosk will show that the transaction referred to in the transaction information was successful and the funds required by the transaction have been directed to one or more accounts of the merchant. Similarly, if the authorization report received by authentication server 300 reflects an approval, the authorization notification sent to the payer device will show that the transaction referred to in the transaction information was successful and the funds required by the transaction have been directed from one or more accounts of the payer.

In another example, if the authorization report received by authentication server 300 reflects a denial, the authorization notification sent to the merchant kiosk may be configured to show that the transaction referred to in the transaction information was unsuccessful and the funds required by the transaction have not been directed to any accounts of the merchant. Similarly, if the authorization report received by authentication server 300 reflects a denial, the authorization notification sent to the payer device may be configured to show that the transaction referred to in the transaction information was unsuccessful and the funds required by the transaction have not been directed from any accounts of the payer.

In yet another example, if the authorization report received by authentication server 300 reflects a denial, the authorization notification sent to the payer device will show that the transaction referred to in the transaction information was unsuccessful and will invite the payer to choose a different payment account or payment card for completing the transaction and attempt to authorize the transaction with that account or card. However, the merchant may not receive the authorization notification in the event of a denial, may receive an authorization notification only after two or more authorization attempts or may receive an authorization notification including a payer-chosen message such as, "changing payment account" or "changing payment card."

Embodiments of the disclosure provide a computer program product that includes a non-transitory or non-transient computer-readable storage medium storing computer-executable code for payment authorization. The code, when executed, is configured to perform the actions of the method as described in conjunction with FIGS. 4 & 5. As actions of the disclosed methods may be provided in different sequences, so the computer-executable code may be configured to provide a service having a different sequence of actions from those illustrated in FIGS. 4 & 5. In some examples, the code may be downloaded from a software application store, for example, from an "App store", to a data processing unit. In an example, the code is implemented as registration application 314 and/or authorization application 316.

The code, when executed, is configured to cause one or more computers such as authorization server 300 to receive, from a device such as payer device 700: merchant identification, kiosk identification identifying a merchant kiosk, a security key and transaction information transmitted to the payer device from a device registered with the merchant identification and payer identification associated with the payer device. The authorization server 300 may additionally receive a merchant IP address and/or a payer IP address.

The code, when executed, is further configured to cause one or more computers to validate the merchant identification, the kiosk identification, the payer identification and the security key when the merchant identification is registered with the kiosk identification in an authorization database, the payer identification is registered with a payer token in the authorization database and the security key is valid. The code, when executed, if further configured to cause the one or more computers to derive a transaction request from the validated merchant identification, the payer token with which the payer identification is registered and the transaction information. For a transaction referred to by the transaction information, the code, when executed is configured to cause the one or more computers to receive, from an acquirer system 120, an authorization report based upon the transaction request.

The code configured to cause one or more computers to receive the merchant identification, the kiosk identification, the security key, the transaction information transmitted and the payer identification may be further configured to cause the one or more computers to receive a date and time.

The code configured to cause one or more computers to receive the payer identification from the payer device is further configured to cause the one or more computers to refuse payer identification from the merchant kiosk.

The code, when executed, may be further configured to cause one or more computers to withhold the payer identification from the acquirer system. The code, when executed, may be configured to cause one or more computers to withhold account numbers and card numbers.

The code configured to cause one or more computers to receive an authorization report may be further configured to cause the one or more computers to receive an authorization report reflecting approval when a limit associated with an account matched with the payer token in a database of the acquirer system is equal to or greater than an amount reflected in the transaction information.

The code configured to cause one or more computers to receive an authorization report may be further configured to cause the one or more computers to receive an authorization report reflecting denial when a limit associated with an account matched with the payer token in a database of the acquirer system is less than an amount reflected in the transaction information.

Further, the code, when executed, may be configured to cause one or more computers to send an authorization notification to the merchant kiosk based upon the authorization report and send an authorization notification to the payer device based upon the authorization report.

Further, the code, when executed, may be configured to cause one or more computers to transmit a fraud notification to the payer device and/or the merchant kiosk when the merchant identification is not registered with the kiosk identification in an authorization database, the payer identification is not registered with a payer token in the authorization database, the security key is invalid or any combination of these.

FIG. 6 schematically illustrates an example merchant kiosk 600. Merchant kiosk 600, in accordance with an embodiment of the disclosure includes, but is not limited to, a memory 610, computing hardware such as a processor 620, Input/Output (I/O) devices 640, a network interface 630, a storage 650 and a system bus 660 that operatively couples various components including memory 610, processor 620, network interface 630, I/O devices 640 and storage 650. Merchant kiosk 600 also includes a power source for supplying electrical power to the various components of kiosk 600. The power source may, for example, include a rechargeable battery.

Memory 610 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 610 stores a merchant application 616 and a variety of other applications 612. Merchant application 616 and other applications 612 may include software products or computer-readable program products causing merchant kiosk 600 to perform various tasks. In the case of the merchant application 616, the software products and/or computer-readable program products are associated with the payment authorization service provided, in part, by kiosk 600. Executing software products on processor 620 results in performing various actions of disclosed payment authorization methods.

I/O devices 640 may include a display screen for presenting graphical images to a user of merchant kiosk 600. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on the display screen. The graphical user interface is configured to facilitate user interactions with the payment authorization service.

Additionally or alternatively, I/O devices 640 include a mouse or a joystick that is operable to receive inputs corresponding to clicking, pointing, and/or moving a pointer object on the graphical user interface. I/O devices 640 may also include a keyboard that is operable to receive inputs corresponding to pushing certain buttons on the keyboard. Additionally, I/O devices 640 may also include a microphone for receiving an audio input from the user, and a speaker for providing an audio output to the user.

Moreover, storage 650 is a non-transient data storage medium. Additionally, the software products, when executed on processor 620, may store registration information, merchant identification, authorization and/or approval codes in storage 650. The software products, when executed on processor 620, are optionally configured to record last updated status of merchant kiosk 600 in storage 650, in case of interruptions in the operable state of merchant kiosk 600.

Furthermore, network interface 630 optionally allows merchant kiosk 600 to transmit or upload registration information, merchant identification, security keys, and transaction information and to receive merchant identification, security keys, transaction information and authorization notices, for example, via communication network 130. Additionally, network interface 630 may allow merchant kiosk 600 to access communication network 130 to update the software products and/or download one or more new software products associated with the payment authorization service. Moreover, network interface 630 optionally allows kiosk 600 to communicate with other data processing systems, for example, via communication network 130.

In an example, merchant kiosk 600 additionally or alternatively includes one or more near-field communications beacons or tags configured to present one or more of the merchant identifying information, the transaction information and the security key to the payer.

Merchant kiosk 600 is optionally implemented by way of at least one of: a mobile phone, a smart telephone, an MID, a tablet computer, a UMPC, a phablet computer, a PDA, a web pad, a handheld PC, and an interactive entertainment device, such as a game console, a TV set and an STB.

At the time of a transaction for one or more merchant goods or services, merchant kiosk 600 is configured to package or otherwise assemble several objects into a single object for transmission to a payer device. For example, merchant kiosk 600 may be configured to package merchant identification, kiosk identification identifying the merchant kiosk, a security key, a merchant IP address and transaction information into a QR code for reading or other interpreting by a payer device. Packaging of the several objects into a single object by merchant kiosk 600 may be performed by processing unit 620 according to computer-readable instructions included with merchant application 616.

Merchant kiosk 600 may also be configured to receive, through network interface 630, an authorization notification from the authorization server based upon the authorization report received thereby.

FIG. 7 schematically illustrates an example payer device suitable for performing disclosed methods as part of a payment authorization system. Payer device 700, in accordance with an embodiment of the disclosure includes, but is not limited to, a memory 710, computing hardware such as a processor 720, Input/Output (I/O) devices 740, a network interface 730, a storage 750 and a system bus 760 that operatively couples various components including memory 710, processor 720, network interface 730, I/O devices 740 and storage 750. Payer device 700 also includes a power source for supplying electrical power to the various components of device 700. The power source may, for example, include a rechargeable battery.

Memory 710 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 710 stores a payer application 716 and a variety of other applications 712. Payer application 716 and other applications 712 may include software products having computer-readable program products causing payer device 700 to perform various tasks. In the case of the payer application 716, the software products and/or computer-readable program products are associated with the transaction validation service provided by device 700 and the payment authorization service provided, in part, by device 700. Executing software products on processor 720 results in performing various actions of disclosed payment authorization methods and/or disclosed transaction validation methods.

I/O devices 740 may include a display screen for presenting graphical images to a user of payer device 700. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on the display screen. The graphical user interface is configured to facilitate payer interactions with the payment authorization service and/or the transaction validation service.

Additionally or alternatively, I/O devices 740 include a mouse or a joystick that is operable to receive inputs corresponding to clicking, pointing, and/or moving a pointer object on the graphical user interface. I/O devices 740 may also include a keyboard that is operable to receive inputs corresponding to pushing certain buttons on the keyboard. Additionally, I/O devices 740 may also include a microphone for receiving an audio input from the user, and a speaker for providing an audio output to the user.

Additionally, the software products, when executed on processor 720, may store registration information, merchant identification, payer identification, security keys, authorization and/or approval codes in storage 750.

Furthermore, network interface 730 optionally allows device 700 to transmit or upload registration information, merchant identification, payer identification, security key, and transaction information and to receive merchant identification, security keys, transaction information and authorization notices, for example, via communication network 130. Additionally, network interface 730 may allow device 700 to access the communication network to update the software products and/or download one or more new software products associated with the payment authorization service and/or transaction validation service. Moreover, network interface 730 optionally allows device 700 to communicate with other data processing systems, for example, via communication network 130.

In an example, payer device 700 is additionally or alternatively configured to receive and translate one or more of the merchant identifying information, the transaction information and the security key from one or more near-field communications beacons or tags of merchant kiosk 600.

Payer device 700 is optionally implemented by way of at least one of: a mobile phone, a smart telephone, an MID, a tablet computer, a UMPC, a phablet computer, a PDA, a web pad and a handheld PC.

Payer device 700 is configured, for example by a payer application 716, to receive, merchant identification, kiosk identification identifying the merchant kiosk, a security key and transaction information through utilization of network interface 730. Payer device 700 may be further configured to receive a merchant IP address.

Further, payer device 700 is configured for example by a payer application 716, to transmit, to an authorization server: the merchant identification, the kiosk identification, the security key and the transaction information and payer identification associated with payer device 700 in an authorization database of the authorization server. With these items, the authentication server may perform a validation of a transaction referred to by the transaction information.

Payer device 700 is configured to transmit the merchant identification, the kiosk identification, the security key, the transaction information and the payer identification without payer account numbers or card numbers. In an example, account numbers and/or card numbers of the payer are not in the possession or custody of payer device 700, for example, in memory 710 or storage 750.

Payer device 700 may be configured, for example by a payer application 716, to receive a fraud notification when the transaction referred to by the transaction information is not validated by the authorization server.

Payer device 700 is configured for example by a payer application 716, to receive an authorization notification based upon an authorization report received by the authorization server for a transaction referred to by the transaction information. The received authorization notification reflects approval of a transaction referred to by the transaction information when a limit associated with a payer account is equal to or greater than an amount reflected in the transaction information. The received authorization notification reflects denial of a transaction referred to by the transaction information when a limit associated with a payer account is less than an amount reflected in the transaction information.

FIG. 8 illustrates an example flow of a method for transaction validation which may be suitable for providing a payer-controlled payment processing service. At 810, merchant identification, kiosk identification identifying the merchant kiosk, a security key and transaction information are received from a merchant kiosk such as merchant kiosk 600. A merchant IP address may also be received. Provided the payer approves the transaction, at 820, a payer device, for example payer device 700, transmits to the authorization server, the merchant identification, the kiosk identification, the security key and the transaction information as well as payer identification associated with the payer device in an authorization database of the authorization server. The payer device may further transmit the merchant IP address and a payer IP address.

In an example, the payer device receives the merchant identification, the kiosk identification, the security key, the transaction information and the payer identification packaged as a QR code.

The method includes transmitting the merchant identification, the kiosk identification, the security key, the transaction information and the payer identification without transmitting payer account numbers or card numbers. In a high security embodiment, neither account numbers, nor card numbers are transmitted during the transaction validation method by the payer device.

In an example, if a payer has registered more than one account for the payer-controlled payment process, he or she may be offered a list of accounts to choose from to complete the transaction. The list may be organized or prioritized according to an account hierarchy established by the user or, for example, by account balances or limits. In another example, an account may be automatically selected from the list according to the hierarchy.

At 830, the objects received by the payer device are validated, for example, by authorization server 300. Here again the payer may provide a passcode and/or a biometric authentication to confirm the desire to complete the transaction. The payer device receives a fraud notification at 840 when the merchant identification is not registered with the kiosk identification in the authorization database, the payer identification is not registered with a payer token in the authorization database, the security key is invalid or any combination of these. See, for example, FIG. 5 for validation details. In an example, the payer device is configured to validate a QR code received from the merchant kiosk for example by confirming it is of a base form valid for use in the disclosed payment authorization service.

The payer device receives an authorization notification from the authentication server at 850 based upon an authorization report received by the authorization server for a transaction referred to by the transaction information. The received authorization notification reflects approval of a transaction referred to by the transaction information when a limit associated with an account matched with the payer identification is equal to or greater than an amount reflected in the transaction information. Upon approval, the payer may be asked to confirm the transaction in addition to or instead of earlier confirmations which confirmation may, as above, include providing a passcode and/or a biometric authentication to confirm the desire to finalize the transaction.

The received authorization notification reflects denial of a transaction referred to by the transaction information when a limit associated with an account matched with the payer identification is less than an amount reflected in the transaction information. Upon a denial of a transaction, a payer may be offered an opportunity to try again to authorize the transaction with another account. In an example, the payer may select another account from a list of accounts. In another example, the payer device may be configured to automatically attempt the transaction again with another account from the list based upon an account hierarchy.

Embodiments of the disclosure provide a computer program product that includes a non-transitory or non-transient computer-readable storage medium storing computer-executable code for transaction validation. The code, when executed, is configured to perform the actions of the method as described in conjunction with FIG. 8. As actions of the disclosed methods may be provided in different sequences, so the computer-executable code may be configured to provide a service having a different sequence of actions from those illustrated in FIG. 8. In some examples, the code may be downloaded from a software application store, for example, from an "App store", to a data processing unit. In an example, the code is implemented as payer application 716.

FIG. 9 illustrates example registration scenario operations of an exemplary payer device, merchant device and authorization server. In FIG. 9, the exemplary registration scenario 900 depicts detailed payer registration and merchant registration operations. The depicted registration scenario 900 includes the payer registration 900A and the merchant registration 900B. In the depicted implementation, the payer registration 900A corresponds to the payer registration described with reference to FIG. 2 at step 210. In the depicted implementation, the merchant registration 900B corresponds to the merchant registration described with reference to FIG. 2 at step 220.

In FIG. 9, the exemplary payer device 700, merchant device 600 and authorization server 300 operate in the distributed payer-controlled payment system architecture 100, also depicted at least in FIGS. 1 and 10. In the depicted example, a first phase of the payer registration 900A begins with the payer obtaining the payment account 905 from the card issuing bank 910. In a second phase of the payer registration 900A the payer, using the payer device 700 registers with the authorization sever 300 for payer-controlled transactions, also depicted in FIG. 2 at step 210. In the example depicted by FIG. 9, at step 915 the payer adds the payer's payment account 905. The payer's payment account 905 may comprise payer account or payer card data. The payer account or payer card data is not stored on the payer device 700. The payer account or payer card data transfers to the authorization server 300. The payer, using a user interface operably coupled with the payer device 700, operates the payer device 700 to send a payer registration request to the authorization server 300. In the depicted implementation the payer registration request is an electronic message comprising payer ID and the payer's payment account 905 information. In the example depicted by FIG. 9, the authorization server 300 receives the registration request from the payer device 700. In the implementation depicted by FIG. 9, the authorization server 300, in response to receiving the registration request, registers the payer device 700. In the depicted implementation, the authorization server 300 registers the payer device 700 by associating and storing the payer ID with the payer's payment account 905 information and a security key in an authorization database (depicted at least by FIG. 1). The authorization server 300 may determine the security key as a function of time and/or a shared secret. In an illustrative example the authorization server 300 may provide the payer device 700 with a copy of a security key provided to the merchant device 600. In the implementation depicted by FIG. 9, the authorization server 300 sends the security key to the payer device 700. In the implementation depicted by FIG. 9, the payer device 700 stores the security key in the payer device 700 memory.

In the example depicted by FIG. 9, a first phase of the merchant registration 900B begins with the merchant obtaining a payment processing account 920 with an acquirer 120. In a second phase of the merchant registration 900B the merchant, using the merchant device 600 registers with the authorization sever 300 for payer-controlled transactions, also depicted in FIG. 2 at step 220. In the example depicted by FIG. 9, the merchant, using a user interface operably coupled with the merchant device 600, operates the merchant device to send a merchant registration request to the authorization server 300. In the depicted implementation the merchant registration request is an electronic message comprising merchant ID and the merchant's payment processing account 920 information. In the example depicted by FIG. 9, the authorization server 300 receives the registration request from the merchant device 600. In the implementation depicted by FIG. 9, the authorization server 300, in response to receiving the registration request, registers the merchant device 600. In the depicted implementation, the authorization server registers the merchant device 600 by associating and storing the merchant ID with the merchant's payment processing account 920 information and the security key in the authorization database. In the depicted implementation, the authorization server 300 provides the merchant device 600 with a copy of the security key provided to the payer device 700. In the implementation depicted by FIG. 9, the merchant device 600 stores the security key in the merchant device 600 memory.

FIG. 10 illustrates example transaction scenario operations of an exemplary payer device, merchant device and authorization server. In FIG. 10, the exemplary transaction scenario 1000 depicts detailed payer and merchant operations. The depicted transaction scenario 1000 includes the payer transaction operations 1000A and the merchant transaction operations 1000B. In the depicted implementation, the payer transaction operations 1000A correspond to the payer transaction operations described with reference to FIG. 2 at step 230. In the depicted implementation, the merchant transaction operations 1000B correspond to the merchant transaction operations described with reference to FIG. 2 at step 240. In FIG. 10, the exemplary payer device 700, merchant device 600 and authorization server 300 operate in the distributed payer-controlled payment system architecture 100, also depicted at least in FIGS. 1 and 9. In the depicted transaction scenario 1000 the payer device 700 and the merchant device 600 collaborate with the authorization server 300, the acquirer 120 and the issuing bank 910 to complete a payer-controlled payment transaction without sending any payment account information or payer ID to the merchant device 600.

In the implementation depicted by FIG. 10, a first phase of the transaction scenario 1000A begins at step 1005 with the payer indicating to the merchant that the payer desires to initiate a purchase transaction. In the depicted implementation, the payer, using a user interface operably coupled with the payer device 700, may activate the payer application 716 (depicted by at least FIG. 7) as described with reference to FIG. 2 at step 230. In the depicted implementation, in response to receiving user input activating the payer application 716, the payer application 716 may configure the payer device 700 to receive the encrypted transaction information message 240M, (discussed in more detail further below) from the merchant device 600. The encrypted transaction information message 240M received from the merchant may comprise merchant ID and transaction information. The payer application 716 may be hosted at least in part by the payer device 700. The payer application 716 may be hosted at least in part by a cloud-based application hosting server.

In the implementation depicted by FIG. 10, the payer application 716 may be configured such that in response to receiving, by the payer device 700, user input activating the payer application 716, the payer application 716 may send the transaction initiation indication 230M (corresponding to activating the payer application 716 at step 230 depicted by FIG. 2) to the merchant device 600. The transaction initiation indication 230M informs the merchant device 600 that the payer desires to initiate a purchase transaction. In some implementations, the transaction initiation indication 230M may be sent to the merchant device 600 by a web service. In an illustrative example, the transaction initiation indication 230M may be sent to the merchant device 600 by a push transaction service configured to enable the payer device 700 to receive push transactions from the merchant. The transaction initiation indication 230M may be sent to the merchant device 600 to enable the merchant to send push transactions to the payer device 700 using a phone number or email address configured in the payer device 700. The transaction initiation indication 230M may comprise an electronic message. The transaction initiation indication 230M may comprise a button press on the merchant device 600. The merchant may configure a web page to display a button that when clicked by a payer using the payer device 700 causes the merchant device 600 to receive the transaction initiation indication 230M referencing the payer device 700.

In the implementation depicted by FIG. 10, a second phase of the transaction scenario 1000B proceeds at step 1010 in response to the merchant device 600 receiving the transaction initiation indication 230M. At step 1010 in response to the merchant device 600 receiving the transaction initiation indication 230M, the merchant device 600 sends the encrypted transaction information message 240M (corresponding to the message sent by the merchant device 600 to the payer device 700 at step 240 depicted by FIG. 2) to the payer device 700. In the depicted implementation, the merchant device 600 sends the encrypted transaction information message 240M to the payer device 700. The encrypted transaction information message 240M sends transaction details to the payer device 700. The transaction details sent in the encrypted transaction information message 240M by the merchant device 600 to the payer device 700 comprise merchant ID, a security key and transaction information referencing a purchase request made by the payer. The merchant device 600 may be configured such that in response to receiving the transaction initiation indication 230M referencing the payer device 700, the merchant device 600 sends the encrypted transaction information message 240M to the payer device 700. The transaction initiation indication 230M may comprise a reference to a transaction with the merchant. The transaction referenced by the transaction initiation indication 230M may be, for example, a product or service offered by the merchant. The reference to the transaction may be a transaction number. The reference to the transaction may be any information uniquely identifying the transaction within the payment system architecture 100. The transaction initiation indication 230M may comprise a reference to the merchant. The reference to the merchant may be a merchant ID. The merchant ID in the transaction initiation indication 230M may correspond to a merchant ID with which the merchant was registered in the authorization database 110 (depicted at least in FIGS. 1 and 11-14). The reference to the merchant may be any information uniquely identifying the merchant within the payment system architecture 100.

The payer device 700 may subscribe to a push transaction service. The payer device 700 may send an electronic message comprising a request to subscribe the payer device to a push an encrypted transaction information message 240M to a subscribed payer device 700. The encrypted transaction information message 240M pushed to the subscribed payer device 700 may contain or reference an offer to purchase that is autonomously pushed to the payer device 700. Such a push transaction may be autonomously pushed to the payer device from a merchant device 600, a web service or from a sales agent operating a user interface operably connected with the distributed payer-controlled payment system architecture 100. The payer device 700 may be configured such that sending the request to subscribe the payer device 700 to the push transaction service activates the payer device 700 to receive the encrypted transaction information message 240M from the merchant device 600.

The merchant, using the merchant device 600, may encode the transaction information message 240M in one or more transaction information data packets. The merchant device 600 may use the VPN 140 (depicted at least by FIG. 1) that is operably coupled with the payer device 700 to send the one or more transaction information data packets to the payer device 700. The payer, using the payer device 700 may receive the one or more transaction information data packets using the VPN 140. The payer device 700 may decode the encoded transaction information message 240M from the one or more transaction information data packets. The merchant device 600 may encrypt the transaction information message 240M. The merchant device 600 may use a security key to encrypt the transaction information message 240M.

The merchant, using the merchant device 600, may encode the transaction information message 240M in an image. The image may comprise a bar code or QR code. The merchant device 600 may use a graphical display to present the image to the payer. The payer, using the payer device 700 may capture the displayed image using a payer device image-capturing interface. The payer device 700 may decode the encoded transaction information message 240M from the captured image. The merchant device 600 may encrypt the transaction information message 240M.

The merchant device 600 may use a security key to encrypt the transaction information message 240M.

The merchant, using the merchant device 600, may encode the transaction information message 240M in a transaction information data record. The merchant device 600 may use one or more near-field communications beacons or tags to present the encoded transaction information data record to the payer. The payer, using the payer device 700 may receive the encoded transaction information data record using a payer device near-field communication interface. The merchant device 600 may encrypt the transaction information message 240M. The merchant device 600 may use a security key to encrypt the transaction information message 240M.

In the depicted implementation a third phase of the transaction scenario 1000C proceeds at step 1015 in response to the payer device 700 receiving the encrypted transaction information message from the merchant device 600. At step 1015, in response to receiving the encrypted transaction information message 240M from the merchant device 600, the payer device 700 presents at least one registered payer account to the payer with a request for payer input to the payer device 700 authentication input interface. The request for payer input comprises a request for payer authorization to use the at least one registered payer account to complete a transaction identified by the transaction information message 240M. In response to receiving payer approval of the transaction, the payer device 700 creates the purchase request 250M (corresponding to the message sent by the payer device 700 to the authorization server 300 at step 250 depicted by FIG. 2) from the encrypted transaction information message 240M and the payer ID. In general, purchase transaction scenarios may be considered as two types, i.e., in-person and remote. In an in-person transaction scenario there may be a certain amount of interaction concluding in the presentation of a QR code, bar code or a push sale. This interaction may be as described herein with reference to the transaction initiation indication 230M and the encrypted transaction information message 240M. However, not all transactions begin with interaction between a payer device and a merchant device. In some purchase transaction scenarios such as for example in a remote sale, the payer device 700 may create the purchase request 250M from purchase information accessed online or from a poster. The payer device 700 may create the purchase request 250M from purchase information entered by the payer into the payer device 700. The payer device 700 may create the purchase request 250M from purchase information scanned by the payer device 700, such as for example from a bar code or QR code on a web page, online brochure or a poster. In such a remote sale, the transaction initiation indication 230M and the encrypted transaction information message 240M may be omitted. In an illustrative example of such a remote sale, the merchant device 600 does not receive the transaction initiation indication 230M and the payer device 700 does not receive the encrypted transaction information message 240M from the merchant device 600. In this remote sale example, the merchant only becomes aware of the sale by reviewing their reports. In this remote sale example, the payer device 700 sends the purchase request 250M to the authorization server 300 and payer-controlled operations proceed as discussed herein. In the implementation depicted by FIG. 10, the payer device 700 sends the purchase request 250M to the authorization server 300. In the implementation depicted by FIG. 10, the authorization server 300 validates the purchase request 250M received from the payer device 700 as described with reference to at least FIG. 5. In response to the authorization server 300 determining the purchase request 250M is valid, the authorization server 300 derives the transaction request 260M (corresponding to the message sent by the authorization server 300 to the acquirer 120 at step 260 depicted by FIG. 2) from the purchase request 250M and sends the transaction request 260M to the acquirer 120. The authorization server 300 may send the transaction request 260M to the acquirer 120 with payer account information. The payer account information sent by the authorization server 300 to the acquirer 120 may be a full card number. The authorization server 300 may send the transaction request 260M to the acquirer 120 with a payer token in place of the payer account information. Multiple payer tokens may be linked in the authorization database 110 with respective payer payment accounts in line with what has been disclosed herein. In the implementation depicted by FIG. 10, the acquirer 120 receives the transaction request 260M. The acquirer 120 determines if the transaction request 260M can be authorized by the issuing bank 910, in line with what has been disclosed herein. Upon determining the transaction request 260M can be authorized, the authorization server 300 independently sends an authorization response 280M (corresponding to the authorization server 300 forwarding an authorization response from the acquirer 120 at step 280 depicted by FIG. 2) independently to the payer device 700 and the merchant device 600. In the implementation depicted by FIG. 10, the authorization response 280M may be a transaction approval notification. In the implementation depicted by FIG. 10, the authorization response 280M may be a transaction approval code.

FIG. 11 illustrates example data flow design of an exemplary payer device, merchant device and authorization server for exemplary payer-controlled scenarios. In FIG. 11, the exemplary data flow design 1100 includes the exemplary merchant registration data flow 1100A, the exemplary payer registration data flow 1100B, the exemplary add payer payment method data flow 1100C and the exemplary payer-controlled transaction data flow 1100D. The depicted exemplary data flow design 1100 depicts data flows in and through an exemplary distributed payer-controlled payment system architecture 100 in a network environment in line with that described at least with reference to FIG. 1 herein.

In the example depicted by FIG. 11, payers 1105 and merchants 1110 may collaborate with the authorization server 300 to engage in payer-controlled transactions. In the depicted implementation, the authorization server 300 hosts the web service 1115. The web service 1115 is operably coupled with the authorization database 110. In the example depicted by FIG. 11, API server 1120 is configured to provide access to web service 1115 and authorization server 300 operations and facilities.

In FIG. 11, the exemplary merchant registration data flow 1100A begins at step 1125 with a merchant 1110 creating a merchant account. In the exemplary merchant registration data flow 1100A, at step 1125 the merchant 1110 using the merchant device 600 registers with the authorization server 300. In the depicted implementation, the merchant device 600 registration comprises the merchant device 600 sending a merchant registration payload to the authorization server 300. In the depicted implementation, the merchant registration payload comprises a kiosk token, merchant account information, merchant acquirer information and merchant ID. The merchant registration payload may also include optional information. In the depicted implementation, the authorization server 300 receives the merchant registration payload. In response to receiving the merchant registration payload, the authorization server 300 registers the merchant 1110 and merchant device 600 based on storing the merchant registration payload in the authorization database 110. The authorization server 300 may associate the stored merchant registration payload with a merchant token and store the associated merchant token with the merchant registration payload in the authorization database 110. In response to registering the merchant 1110 and merchant device 600, at step 1130 the authorization server 300 sends to the merchant device 600 a payload comprising the associated merchant token. The merchant token may be used by the merchant 1110 or merchant device 600 to represent the merchant account information in a transaction with an acquirer system.

In FIG. 11, the exemplary payer registration data flow 1100B begins at step 1135 with a payer 1105 creating a payer account. In the exemplary payer registration data flow 1100B, at step 1135 the payer 1105 using the payer device 700 registers with the authorization server 300. In the depicted implementation, the payer device 700 registration comprises the payer device 700 sending a payer registration payload to the authorization server 300. In the depicted implementation, the payer registration payload comprises a payer application token associated with the payer application 716 (depicted at least by FIG. 7), payer ID comprising payer name, payer address, payer phone number and payer email address, payer password and/or a payer personal identification number (PIN). The payer password may be selected by the payer 1105. The payer PIN may be selected by the payer 1105. In the depicted implementation, the authorization server 300 receives the payer registration payload. In response to receiving the payer registration payload, the authorization server 300 registers the payer 1105 and payer device 700 based on storing the payer registration payload in the authorization database 110. The authorization server 300 may associate the stored payer registration payload with a payer token issued by the authorization server 300. The authorization server 300 stores the associated payer token with the payer registration payload in the authorization database 110. In response to registering the payer 1105 and payer device 700, at step 1140 the authorization server 300 sends to the payer device 700 a payload comprising the associated payer token issued by the authorization server 300. The payer token may be used by the payer 1105 or payer device 700 to represent the payer account information in a transaction as described herein.

In FIG. 11, the exemplary add payer payment method data flow 1100C begins at step 1145 with the payer 1105 adding a payment method to their wallet. In the exemplary payer payment method data flow 1100C, at step 1145 the payer 1105 may operate a user interface operably coupled with the payer device 700 to add the payment method to their wallet. In the depicted implementation, the payment method to be added to the payer 1105 wallet may be a payment card account. The payer 1105 using the payer device 700 may enter or scan their payment card into the payer device 700. The payer device 700 may be configured to require a PIN or biometric authentication from the payer 1105 to authorize adding the payment method to the wallet. In the depicted implementation, at step 1145 the payer device 700 sends an exemplary add payer payment method payload to the authorization server 300. In the depicted implementation, the add payer payment method payload comprises a payer token issued by the authorization server 300 and the payment account information to be added to the wallet. In the depicted implementation the payer token sent with the add payer payment method payload is the payer token received from the authorization server 300 during payer registration 1100B. In the depicted implementation, the authorization server 300 receives the add payer payment method payload. In response to receiving the add payer payment method payload, the authorization server 300 associates the payment method to be added with the payer ID referenced by the payer token. In the depicted implementation, the authorization server 300 stores the account information associated with the added payment method and a payer token linked to the added payment method in the authorization database 110. The authorization server 300 may store the added payment method and payer token in the authorization database 110 with the payer ID and any associated payment methods previously added by the payer 1105. At step 1150, the authorization server 300 sends to payer device 700 the payer token that is linked to the added payment method in the authorization database 110.

In FIG. 11, the exemplary payer-controlled transaction data flow 1100D begins at step 1155 stage 1 with the merchant device 600 sending the encrypted transaction information message 240M to the payer device 700. In the depicted example, the encrypted transaction information message 240M comprises merchant ID and transaction information. The transaction information may comprise merchant ID, a security key and transaction information referencing a purchase request made by the payer 1105. The merchant device 600 may send the encrypted transaction information message 240M to the payer device 700 via any of an SMS message received by the payer device 700, via a bar code or QR code scanned by the payer device 700, via near-field communications or via a VPN. In the depicted implementation, the payer 1105 using the payer device 700 may approve the transaction. The payer 1105 may approve the transaction using a PIN, passcode or biometric input to the payer device 700. In response to receiving payer approval for the transaction, the payer device 700 sends the purchase request 250M to the authorization server 300. The purchase request 250M sent by the payer device 700 to the authorization server may comprise the merchant ID and transaction information referencing the purchase requested by the payer 1105. The purchase request 250M sent by the payer device 700 to the authorization server may comprise a payer token, a payer payment account token, or a merchant token. The authorization server 300 validates the purchase request 250M received from the payer device 700 as described with reference to at least FIG. 5.

At step 1155 stage 2, in response to the authorization server 300 determining the purchase request 250M is valid, an API server configured in the authorization server 300 collects the stored payer 1105 payment method account information and stored merchant 1110 account information. The authorization server 300 derives a transaction request from the purchase request 250M as described with reference to at least FIGS. 2 and 10. The authorization server 300 sends the transaction request to the acquirer 120 at step 1160. The transaction request sent by the authorization server 300 to the acquirer 120 may comprise the payer 1105 payment method account information and merchant 1110 account information. The transaction request sent by the authorization server 300 to the acquirer 120 may comprise a payer 1105 token. The transaction request sent by the authorization server 300 to the acquirer 120 may comprise a merchant 1110 token. The transaction request sent by the authorization server 300 to the acquirer 120 may comprise merchant 1110 ID. The acquirer 120 determines if the transaction request can be authorized, in line with what has been disclosed herein. Upon determining the transaction request can be authorized, at step 1155 stage 3 the authorization server 300 independently sends an authorization response 280M (corresponding to the authorization server 300 forwarding an authorization response from the acquirer 120 at step 280 depicted by FIG. 2) independently to the payer device 700 and the merchant device 600.

FIG. 12 illustrates example operations of an exemplary payer device, merchant device and authorization server for exemplary one-touch scenarios. In the exemplary one-touch scenario 1200 depicted by FIG. 12, the merchant 1110 creates purchase objects 1205. The objects 1205 may be items or services to be offered for purchase. The merchant 1110 may create the button 1210 using methods and apparatus disclosed herein. The button 1210 may be an electronic button. The merchant 1110 may present the electronic button with an offer to purchase the objects 1205 using methods and apparatus disclosed herein. The electronic button may be for example, a clickable button configured in a web page. The electronic button may be a clickable button configured in an email. The electronic button may be a clickable link. The electronic button may be a clickable image. The electronic button may be a clickable button, link or image configured in any digital content. The electronic button may be configured to link with information associated with an offer by the merchant 1110 to purchase the objects 1205. The button 1210 may be a "Buy Now" button. The "Buy Now" button may be configured in a web page. The information associated with the offer may be stored in a database. An implementation may be configured to retrieve the information associated with the offer when the electronic button is clicked. The "Buy Now" button may be configured in any digital content. The digital content may be hosted by the merchant 1110. The button 1210 may be configured to permit a payer to purchase the objects 1205 with one touch or click to the button 1210 using methods and apparatus disclosed herein.

The merchant may create the image 1215 using methods and apparatus disclosed herein. The image 1215 may comprise a QR code. The image 1215 may comprise a bar code. The image 1215 may encode digital information associated with the offer by the merchant 1110. The image 1215 may encode a link to the digital information associated with the offer by the merchant 1110. The image 1215 may encode the digital information associated with the offer. The merchant 1110 may present the image 1215 with an offer to purchase the objects 1205 using methods and apparatus disclosed herein. A payer using the payer device 700 may optically scan the image 1215. The payer device 700 may decode from the scanned image 1215 the digital information associated with the offer. The payer using the payer device 700 may click on the button 1210. In response to clicking the button 1210, the payer device 700 may receive the digital information associated with the offer.

In any case, whether by scanning the image 1215 or clicking the button 1210, the payer device 700 receives from the merchant 1110 the digital information associated with the offer. Upon obtaining the digital information associated with the offer, the payer device 700 presents the offer to the payer for approval. As disclosed herein, the payer approval may be biometric input, a password, PIN or other authentication input provided by the payer using the payer device 700. In response to receiving payer approval and based on the digital information associated with the offer, the payer device 700 creates the purchase request 250M (described at least with reference to FIGS. 10 and 11). The payer device 700 sends the purchase request 250M to the authorization server 300. The authorization server 300 uses payer and merchant information securely stored in the authorization database 110 to validate the purchase request 250M received from the payer device 700, as disclosed herein. In response to determining the purchase request 250M is valid, the authorization server 300 derives and sends a transaction request to the acquirer system 120. The acquirer system 120 may be an acquiring bank. The acquirer system 120 determines if the requested transaction can be completed. In the successful case that the requested transaction can be completed, the acquirer system 120 provides the authorization response 280M (described at least with reference to FIGS. 10 and 11) to the authorization server 300. The authorization server 300 forwards the authorization response 280M independently to the payer device 700 and the merchant, permitting the payer to purchase the objects 1205 with one touch or click to the button 1210 or one scan of the image 1215.

FIG. 13 illustrates an example operating environment of an exemplary payer device, merchant device and authorization server for exemplary one-touch scenarios. In FIG. 13, the exemplary operating environment 1300 comprises security features such as software firewalls 1305, physical firewalls 1310, SSL/VPN connections 1315 and SSL connections 1320. The depicted security features are configured to protect network connections between various combinations of the payer device 700, the merchant device 600, the web service 1115, the authorization server 300, the authorization database 110, the acquirer system 120 and the merchant online portal/call center 1325.

In the example depicted by FIG. 13, a software firewall 1305 protects the SSL/VPN 1315 network connection between the payer device 700 and the web service 1115. In the example depicted by FIG. 13, a software firewall 1305 protects the web service 1115 SSL 1320 connections with the merchant device 600 and the merchant online portal/call center 1325. In the example depicted by FIG. 13, a software firewall 1305 protects the SSL/VPN 1315 network connection between the authorization server 300 and the acquirer system 120. In the depicted example, the software firewall 1305 between the authorization server 300 and the acquirer system 120 is configured facing the acquirer system 120. The software firewall 1305 facing the acquirer system 120 is configured outside a high security zone reinforced by the physical firewall 1310 facing the authorization server 300. In the example depicted by FIG. 13, all network connections with the authorization server 300 are protected in the high security zone established by three physical firewalls 1310. In an illustrative example each of the physical firewalls may be a dedicated high security router configured as a network security system in accordance with best practices. In the example depicted by FIG. 13, a physical firewall 1310 protects the SSL/VPN 1315 network connection between the web service 1115 and the authorization server 300. In the example depicted by FIG. 13, a physical firewall 1310 protects the SSL/VPN 1315 network connection between the authorization server 300 and the authorization database 110. One of ordinary skill would recognize that references herein to SSL may be considered synonymous and interchangeable with TLS. In the depicted example the payer device 700 and the merchant device 600 are operably coupled by the VPN 140, also depicted at least in FIG. 1. The network connection through the VPN 140 between the payer device 700 and the merchant device 600 may be an SSL/VPN 1315 network connection.

FIG. 14 illustrates an example process flow of an exemplary payer device, merchant device and authorization server for an exemplary one-touch scenario.

In FIG. 14, the exemplary one-touch process 1400 begins at step 1405 with a merchant using the merchant online portal/call center 1325 to create content comprising items or services to be offered for purchase. The content may be digital advertising. The content may be presented on a web page. The merchant using the merchant online portal/call center 1325 may create and place the button 1210 in the advertising content. The button 1210 may be a clickable button on a web page as described herein. The button 1210 may link to or contain digital information associated with the purchase offer. The merchant using the merchant online portal/call center 1325 may create and place the image 1215 in the advertising content. The image 1215 may comprise a bar code, QR code or any type of image encoding digital information. The digital information encoded by the image 1215 may comprise digital information associated with the purchase offer. The digital information encoded by the image 1215 may link to digital information associated with the purchase offer. In the depicted example, the button 1210 and/or the image 1215 are configured to provide the payer device 700 information associated with the purchase offer and to provide the merchant device 600 with information enabling the merchant device 600 to send the purchase offer to the payer device 700.

With continued reference to exemplary operations of the method 1400 at step 1405, the merchant online portal/call center 1325 may configure the button 1210 when clicked to cause the merchant device 600 to send the transaction information message 240M (described at least with reference to FIGS. 9 and 10) to the payer device 700. For example, source code of the web page may be configured to obtain information identifying the payer device 700 that clicked the button 1210. The source code of the web page may be configured to send the information identifying the payer device 700 to the merchant device 600. The information identifying the payer device 700 may be for example a payer device 700 serial number or a TOTP-based ephemeral (i.e., temporary) identifier generated dynamically when the button 1210 is clicked, protecting the device user's privacy. The merchant device 600 may use the information identifying the payer device 700 for determining which payer device 700 should receive the transaction information message 240M when multiple payer devices 700 may be present. For example, the merchant device might cross-reference the information identifying the payer device 700 with a table of payer device 700 Internet Protocol (IP) addresses, payer device 700 locations or other payer device 700 parameters that may assist the merchant device 600 in selectively sending the transaction information message 240M to one payer device 700 that clicked the button 1210. The merchant device 600 may be configured to send the transaction information message 240M to the payer device 700 when the payer using the payer device 700 clicks the buy now button 1210. The merchant online portal/call center 1325 may configure the button 1210 to cause the payer device 700 to activate the payer application 716 (described with reference to FIG. 7) when the payer using the payer device 700 clicks the button 1210. Activating the payer application 716 may configure the payer device 700 to receive the transaction information message 240M.

At step 1410, the merchant may use the merchant online portal/call center 1325 to create a purchase code. Using the merchant online portal/call center 1325, the merchant may create a purchase code with a combination of unique parameters. For example, the purchase code features may comprise merchant ID, purchase code creation date, purchase code creation time, purchase price, currency, type of purchase code (e.g., QR code, Buy Now button or push transaction), creator identity, merchant location ID, merchant kiosk ID and expiration date. In the depicted example, the merchant using the merchant online portal/call center 1325 sends the purchase code to the authorization server 300 for validation.

With continued reference to exemplary operations of the method 1400 at step 1410, the merchant using the merchant online portal/call center 1325 may configure the purchase offer as a push sale or push transaction. In an exemplary push sale or push transaction configuration, the merchant online portal/call center 1325 may configure the purchase offer to be autonomously pushed from the merchant device 600 to the payer device 700. The merchant device 600 may be configured to autonomously push the encrypted transaction information message 240M to the payer device 700. The payer device 700 may be configured to automatically activate the payer application 716 upon receipt of the transaction information message 240M, if the payer device 700 has subscribed to push transactions. The payer device 700 may be configured such that by activating the payer application 716, the payer device 700 automatically presents the push sale or push transaction information to the payer for approval in line with what has been disclosed herein. The merchant device 600 may employ various techniques to prepare for pushing a transaction to a payer device 700. Preparing for pushing a transaction to the payer device 700 may require discovering the payer device 700, determining if the payer device has registered for push transactions and accessing the VPN 140 connecting the payer device 700 with the merchant device 600. Such techniques are disclosed herein.

Discovering the Payer Device

With continued reference to exemplary operations of the method 1400 at step 1410, the merchant device 600 may be configured to use various techniques for discovering the physical presence of the payer device 700. The payer device 700 may be near the merchant device 600. For example, the merchant device 600 may be configured to detect a wireless data communication interface address broadcast by the payer device 700. The interface may be, for example, a Medium Access Control (MAC) address, a Bluetooth® address, a Service Set Identifier (SSID) or a Mobile Equipment Identifier (MEID). The merchant device 600 may periodically scan the local electromagnetic environment to identify wireless interface addresses local to the merchant device 600. In some cases a custom router or other network appliance may be configured to scan for wireless interface addresses present at a location remote from the merchant device 600, sending the detected addresses to a web server remote from the network appliance. In some cases the merchant device 600 may be the web server. The web server may send push transactions to the payer device 700.

Determining if the Payer Device Registered for Push Transactions

With continued reference to exemplary operations of the method 1400 at step 1410, the authorization server may host a table of payer device 700 wireless interface addresses of payer devices that have subscribed to push transactions. Based on cross-referencing the identified local wireless interface addresses with the table of payer devices that have subscribed to push transactions, the merchant device 600 may determine that a payer device 700 currently located near the merchant device 600 is available to receive a push transaction.

With continued reference to exemplary operations of the method 1400 at step 1410, the payer device 700 may be configured in a promiscuous mode for push transactions, such that the payer application 716 is always activated to receive the transaction information message 240M from the merchant device 600. The payer device 700 and the merchant device 600 may possess in common a shared secret governing push transaction security. For example, the authorization server 300 may distribute a shared secret to the payer device 700 and the merchant device 600 at registration. In an illustrated example the shared secret may be the security key, or a hash of the security key. In any case, the payer device 700 in the promiscuous mode for push transactions is always activated to receive the transaction information message 240M from the merchant device 600. In such a promiscuous mode push transaction scenario, upon detecting the payer device 700 physical presence, the merchant device 600 may autonomously send the transaction information message 240M comprising a push transaction to the payer device 700. In this example, the payer device 700 and the merchant device 600 may be configured with a push transaction security validation algorithm comprising a time-based one-time password (TOTP). The TOTP algorithm may be seeded by the security key, for example. The transaction security validation algorithm may comprise adding the TOTP to purchase code metadata for the push transaction. Upon receiving the push transaction, the payer device may check the validity of the TOTP in the push transaction metadata against the TOTP generated locally on the payer device 700. Upon determining the TOTP for the push transaction security validation is correct, the payer device 700 may present the pushed transaction to the payer for approval in line with what has been disclosed herein. Otherwise, the payer device 700 may ignore the push transaction.

With continued reference to exemplary operations of the method 1400 at step 1410, a payer device 700 may be configured to receive push transactions sent to a phone number associated with the payer device 700. For example, the push transaction may be sent via an SMS message to the phone number associated with the payer device 700. The payer device 700 may be configured in a promiscuous mode for push transactions sent to the phone number, such that the payer application 716 is always activated to receive and process a transaction information message 240M comprising a push transaction encoded in an SMS message. The payer device 700 may be configured with a push transaction security validation algorithm based on TOTP as discussed herein. The push transaction security validation algorithm may be adapted to govern security validation for push transactions received via SMS. For example, the TOTP may be included with the push transaction metadata in the SMS message. In case of a payer device 700 that is not in a promiscuous mode for push transactions, upon receiving a push transaction via SMS, the payer device 700 may check the validity of the TOTP in the push transaction metadata against the TOTP generated locally on the payer device 700 for the push transaction security validation. Upon determining the TOTP for security validation of the SMS push transaction is correct, the payer device 700 may activate the payer application 716 to present the SMS push transaction to the payer for approval. Otherwise, the payer device 700 may ignore the SMS push transaction.

Accessing the VPN Connecting the Payer Device with the Merchant Device With continued reference to exemplary operations of the method 1400 at step 1410, in some cases the merchant device 600 sends the transaction information message 240M to the payer device 700 via the VPN 140, described with reference to at least FIG. 1. In such scenarios the merchant device 600 may need to gain access to the VPN 140 to send the transaction information message 240M to the payer device 700. The merchant device 600 may use various techniques to gain access to the VPN 140. For example, the payer device 700 may host a wireless (e.g., Wi-Fi) hotspot. The payer device 700 may configure the Wi-Fi hotspot to broadcast an SSID determined as a function of a TOTP seeded with a shared secret common to the payer device 700 and the merchant device 600. The merchant device 600 may detect a wireless communication interface address of the payer device 700 and cross-reference the address using a table as discussed herein. In response to detecting the wireless communication interface address of a payer device 700 the merchant device 600 may determine the SSID that the payer device 700 will broadcast as of the detection time. The merchant device 600 may connect to the payer device 700 Wi-Fi hotspot using the dynamically generated TOTP-based SSID broadcast by the payer device 700. A Wi-Fi network password may also be dynamically generated based on such TOTP-based techniques. Once connected to the payer device 700 Wi-Fi hotspot, the merchant device 600 may proceed to connect to the VPN 140. The payer device 700 may implement a VPN server hosting the VPN 140. In an illustrative example the login credentials to the VPN 140 may be determined dynamically using TOTP-based techniques, such that the merchant device 600 is configured to determine a dynamically generated login ID and password for access to the VPN 140 hosted by the payer device 700. The TOTP governing access to the VPN 140 may be seeded or based on the security key. In an illustrative example, the payer device 700 may be configured to host a DNS server on the VPN, configured to resolve hostnames to VPN addresses. In this example, the VPN DNS hosted by the payer device 700 may be configured to resolve a predetermined hostname for the payer device, such as for example the names "payer" or "consumer" The VPN DNS hosted by the payer device 700 may be configured to resolve the names "payer" or "consumer" to the VPN address of the payer device 700 on the VPN 140. In this example, upon connecting to the VPN 140 as described herein, the merchant device 600 may be configured to send the transaction information message 240M to the hostname "payer." The payer device 700 may receive the transaction information message 240M via the VPN 140 to be processed in line with what has been disclosed herein.

At step 1415, upon determining the purchase code created by the merchant is valid, the authorization sever 300 assigns a purchase code ID to the validated purchase code. In the depicted example, the authorization server associates and stores the purchase code ID with the validated purchase code in the authorization database 110.

In the depicted example the payer using the payer device 700 clicks the button 1210 to obtain the digital information associated with the purchase offer.

At step 1420, in response to the payer clicking the button 1210 or scanning the image 1215, the payer device 700 activates the payer application 716 to receive the transaction information message 240M. In response to the payer clicking the button 1210 the merchant device 600 or the merchant online portal/call center 1325 sends the transaction information message 240M comprising the purchase offer to the payer device 700. In the implementation depicted by FIG. 14, the merchant device 600 or the merchant online portal/call center 1325 sends the transaction information message 240M comprising the purchase offer to the consumer's phone via an SMS message in line with what has been described herein.

At step 1425, if a purchase code for the purchase offer was created at step 1410, the merchant device 600 or the merchant online portal/call center 1325 sends the purchase code to the authorization server 300 to be recorded in the authorization database 110.

At step 1430, the payer device 700 presents the purchase offer to the consumer for approval. In response to receiving consumer approval input, the payer device 700 sends a purchase request comprising the purchase offer and the consumer ID to the authorization server 300. In the depicted example, the purchase request comprises the merchant ID, date, time, purchase code ID, location ID and Consumer ID or payer ID.

At step 1435, the authorization server 300 performs a test to determine if the purchase request is valid. For example the authorization server may determine if the consumer and merchant are valid and registered in the authorization database 110, in line with what has been disclosed herein. In response to determining the purchase request is valid, the method continues at step 1440. In response to determining the purchase request is not valid, the method continues at step 1445.

At step 1440, the authorization server 300 derives a transaction request based on the validated purchase request. The authorization server 300 sends the transaction request to the acquirer system 120.

At step 1445, the authorization server logs the purchase request validation error determined by the authorization server 300 at step 1435. The authorization server 300 may send a notification concerning the purchase request validation error.

At step 1450, the authorization server 300 receives an authorization response from the acquirer system 120. The authorization response received by the authorization server 300 from the acquirer system 120 may comprise the authorization response 280M in line with what has been disclosed herein.

At step 1455, the authorization server 300 creates a transaction record comprising the authorization response 280M in the authorization database 110.

At step 1460, the authorization server 300 performs a test to determine if the transaction was approved, based on the authorization response 280M received from the acquirer system 120. In response to determining the transaction was approved, the method continues at step 1465. In response to determining the transaction was not approved, the method continues at step 1445. In response to determining the approved transaction included a redeemed purchase code, the method continues at step 1470.

At step 1465, the authorization server 300 processes the approved transaction. Processing the approved transaction may comprise logging the approved transaction and forwarding the authorization response 280M independently to the payer device 700 and the merchant device 600.

At step 1470, the authorization server 300 marks the purchase code redeemed in the authorization database 110.

The method 1400 may repeat.

The method 1400 may end.

Although various features have been described with reference to the Drawings, other features are possible. For example, an exemplary apparatus may comprise: an authorization server comprising: an authorization server processor; and an authorization server memory, wherein the authorization server memory is configured to be operably coupled with the authorization server processor, and wherein the authorization server memory comprises processor executable program instructions configured to cause the authorization server to perform operations; an authorization database configured to be operably coupled with the authorization server processor; a payer device comprising: a payer device processor; a payer device memory, wherein the payer device memory is configured to be operably coupled with the payer device processor, and wherein the payer device memory comprises processor executable program instructions configured to cause the payer device to perform operations; a payer device authentication input interface configured to be operably coupled with the payer device processor, the payer device authentication input interface configured to receive user input; a payer device image-capturing interface configured to be operably coupled with the payer device processor; and a payer device near-field communication interface configured to be operably coupled with the payer device processor; a merchant device comprising: a merchant device processor; and a merchant device memory, wherein the merchant device memory is configured to be operably coupled with the merchant device processor, and wherein the merchant device memory comprises processor executable program instructions configured to cause the merchant device to perform operations; a communication network, configured to be operably coupled with one or more of the authorization server processor, the payer device processor, the merchant device processor and an acquirer system; a VPN configured to be communicatively coupled with the payer device processor and the merchant device processor, wherein the VPN is configured to tunnel through the communication network; and the operations performed by the merchant device further comprise: in response to the merchant device receiving a transaction initiation indication from a web page button clicked by a payer, the transaction initiation indication comprising a purchase request referencing the payer device, send an encrypted transaction information message to the payer device from the merchant device using at least the VPN, and wherein the encrypted transaction information message comprises merchant ID, a security key and transaction information referencing the purchase request.

The payer device authentication input interface may be configured to receive a biometric input.

The biometric input the payer device authentication input interface may be configured to receive further comprises one or more of: a fingerprint scan, a retina scan, a face scan, a voice sample, a touch gesture, a motion gesture, or a touch pattern.

The payer device authentication input interface may be configured to receive an alphanumeric input further comprising one or more of a password or passcode.

The payer device image-capturing interface may be configured to read data from an image scanned by the payer device image-capturing interface.

The payer device image-capturing interface may further comprise a camera.

The operations performed by the payer device may further comprise receive user input activating the payer device to initiate a transaction.

The user input activating the payer device to initiate a transaction may further comprise one or more of a fingerprint scan, a retina scan, a face scan, a voice sample, a touch gesture, a motion gesture, a touch pattern, a password, or a passcode.

The operations performed by the payer device may further comprise in response to receiving user input activating the payer device to initiate a transaction, send, to the merchant device, an electronic message comprising the transaction initiation indication and configure the payer device to receive the encrypted transaction information message from the merchant device.

The payer device near-field communication interface may be configured to receive data from one or more near-field communications beacons or tags.

The operations performed by the payer device processor may further comprise in response to a payer using the payer device to click the web page button, send the transaction initiation indication to the merchant device.

The operations performed by the merchant device processor may further comprise encode a purchase offer in an image and display the image.

The operations performed by the payer device processor may further comprise scan an image displayed by the merchant device and decode a purchase offer from the scanned image.

The operations performed by the payer device processor may further comprise in response to determining the purchase offer in the scanned image is valid, present the purchase offer to the payer for approval.

The operations performed by the payer device processor may further comprise in response to receiving payer approval, creating a purchase request based on the purchase offer in the scanned image and send the purchase request to the authorization server.

The operations performed by the merchant device processor may further comprise push an SMS message comprising a purchase offer to a phone number associated with the payer device.

The operations performed by the payer device processor may further comprise receive a purchase offer in an SMS message from the merchant device.

The operations performed by the payer device processor may further comprise in response to determining the purchase offer in the SMS message is valid, present the purchase offer to the payer for approval.

The operations performed by the payer device processor may further comprise in response to receiving payer approval, create a purchase request based on the purchase offer in the SMS message and send the purchase request to the authorization server.

The merchant device may further comprise one or more near-field communications beacons or tags configured to be operably coupled with the merchant device processor, the one or more near-field communications beacons or tags configured to present data, and wherein send the encrypted transaction information message to the payer device from the merchant device further comprises using at least the one or more near-field communications beacons or tags if a type of transaction initiated is wireless.

The merchant device may further comprise a graphical display configured to be operably coupled with the merchant device processor, wherein the graphical display is configured to display an image, and wherein send the encrypted transaction information message to the payer device from the merchant device further comprises using at least the graphical display one or more near-field communications beacons or tags if a type of transaction initiated is physical point of sale.

The image may further comprise a bar code or a QR code.

The operations performed by the merchant device may further comprise encode the encrypted transaction information message in an image and display the image.

The authorization server may provide the security key to the payer device and the merchant device.

The operations performed by the authorization server may further comprise receive, from the payer device, a payer device registration request, wherein the payer device registration request comprises payer ID and payer account information, and send, to the payer device, the security key.

The operations performed by the authorization server may further comprise in response to receiving the payer device registration request, register the payer device, comprising associate and store the payer ID with the payer account information and the security key in the authorization database.

Register the payer device may further comprise associate and store the payer ID and the payer account information with a selected payer token from a plurality of payer tokens issued by the authorization server, wherein the selected payer token is registered and stored with the payer ID and the payer account information in the authorization database.

The operations performed by the authorization server may further comprise receive, from the merchant device, a merchant device registration request, wherein the merchant device registration request further comprises merchant ID and merchant account information, and send, to the merchant device, the security key.

The operations performed by the authorization server may further comprise in response to receiving the merchant device registration request, register the merchant device, comprising associate and store the merchant ID with the merchant account information and the security key in the authorization database.

The operations performed by the merchant device may further comprise receive, from the authorization server, the security key and store the security key in the merchant device memory and wherein the operations performed by the payer device further comprise receive a selected payer token from the authorization server and store the selected payer token in the payer device memory.

The operations performed by the merchant device may further comprise configure a web page to display a button that when clicked by a payer using the payer device, sends the encrypted transaction information message to the payer device.

The web page button may be a "Buy Now" button.

The operations performed by the merchant device may further comprise configure a web page to display an image encoding the encrypted transaction information message.

The image may further comprise a bar code or a QR code.

The operations performed by the payer device may further comprise receive, from the authorization server, the security key and store the security key in the payer device memory.

The operations performed by the merchant device may further comprise receive, from the authorization server, the security key and store the security key in the merchant device memory.

The transaction initiation indication received by the merchant device may further comprise an electronic message received by the merchant device.

The electronic message may be received from a web service application.

The electronic message received by the merchant device processor may further comprise an identifier associated with the payer device.

The electronic message received by the merchant device processor may further comprise a phone number associated with the payer device.

The transaction initiation indication received by the merchant device may further comprise an electronic message from a button click on a web page.

The transaction initiation indication received by the merchant device may further comprise a physical phenomenon affecting the merchant device.

The physical phenomenon may further comprise a button press on the merchant device or a merchant kiosk.

The physical phenomenon may further comprise a bar code or QR code displayed by the payer device and captured by the merchant device.

The physical phenomenon may further comprise a text message received by the merchant device.

The physical phenomenon may further comprise a touch screen press on the merchant device or a merchant kiosk.

The physical phenomenon may further comprise a wireless detection, by the merchant device, of a wireless data communication interface address configured in the payer device.

The wireless data communication interface address may further comprise a Medium Access Control (MAC) address, a Bluetooth® address, a Service Set Identifier (SSID) or a Mobile Equipment Identifier (MEID).

The operations performed by the merchant device processor may further comprise in response to receiving the transaction initiation indication, send, from the merchant device, the encrypted transaction information message to the payer device using at least one of: the VPN, a graphical display, or one or more near-field communications beacons or tags.

The operations performed by the payer device processor may further comprise receive the encrypted transaction information message from the merchant device using at least one of: the VPN, the payer device image-capturing interface, or the payer device near-field communication interface.

The operations performed by the payer device processor may further comprise in response to receiving the encrypted transaction information message from the merchant device, present, using the payer device, to a payer user, at least one registered payer account with a request for payer input to the payer device authentication input interface, the request for payer input comprising a request for payer authorization to use the at least one registered payer account to complete a transaction identified by the transaction information referencing the purchase request.

The operations performed by the payer device processor may further comprise in response to receiving, via the payer device authentication input interface, payer authorization to complete a transaction identified by the transaction information referencing the purchase request, derive an encrypted transaction request comprising a payer ID read from the payer device memory and the encrypted transaction information message.

The operations performed by the payer device processor in response to receiving payer authorization to complete the transaction may further comprise send the encrypted transaction request to the authorization server.

The operations performed by the authorization server processor may further comprise receive the encrypted transaction request from the payer device.

The operations performed by the authorization server processor may further comprise in response to receiving a transaction request from the payer device, determine if the transaction request is valid.

Determining whether the transaction request is valid may further comprise determining whether the security key comprises a base form, core, or kernel of a predetermined general code.

Determine if the transaction request is valid may further comprise determining whether the transaction request contains a payer ID that is valid, comprising determining whether the payer ID is associated in the authorization database with a valid security key.

Determine if the transaction request is valid may further comprise determining whether the transaction request contains a valid merchant ID, comprising determining whether the merchant ID is associated in the authorization database with a valid security key.

The operations performed by the authorization server upon determining the transaction request is not valid may further comprise send at least one notification to at least one of the payer device or the merchant device.

The operations performed by the authorization server upon determining the transaction request is valid may further comprise send the transaction request with payer account information to the acquirer system, wherein the payer account information is retrieved from the authorization database.

The operations performed by the authorization server upon determining the transaction request is valid may further comprise send the transaction request with a payer token to the acquirer system, wherein the payer token is retrieved from the authorization database by association with payer account information in the authorization database.

The operations performed by the authorization server may further comprise receive from the acquirer system a transaction approval code and authorization uniquely associated with the purchase request referencing the payer device and the transaction information referencing the purchase request.

The operations performed by the authorization server in response to receiving the transaction approval code and authorization may further comprise send, to the merchant device, the transaction approval code and send, to the payer device, a transaction approval notification.

The operations performed by the payer device may further comprise use at least the VPN to receive the encrypted transaction information message from the merchant device if transaction type is online; use at least the payer device image-capturing interface to receive the encrypted transaction information message from the merchant device if transaction type is physical point of sale; and use at least the payer device near-field communication interface to receive the encrypted transaction information message from the merchant device if transaction type is wireless.

The authorization server memory may be operably coupled with the authorization server processor.

The payer device memory may be operably coupled with the payer device processor.

The merchant device memory may be operably coupled with the merchant device processor.

The authorization database may be operably coupled with the authorization server processor.

The authorization database may further comprise a data file accessible to the authorization server processor.

The authorization database may be a data file accessible to the authorization server processor.

The security key may be determined by the authorization server processor, the payer device processor and the merchant device processor as a function of time and a shared secret generated by the authorization server processor, and wherein the shared secret is distributed to the payer device and the merchant device by the authorization server processor when the payer device and merchant device register with the authorization server.

The security key may further comprise a base form of a predetermined general code.

The base form of the predetermined general code may comprise a core or kernel of the predetermined general code underlying all codes and security keys exchanged between any combination of the authorization server, the payer device and the merchant device.

The security key may be periodically redetermined.

The security key may be periodically redetermined by the authorization server processor.

In response to determining the security key is not valid the operations performed by the authorization server processor may further comprise determining a new security key; and distributing the new security key to the payer device and the merchant device.

Payer device and merchant device access to the VPN may be governed by the security key.

The security key may be determined based on one or more of RFC 6238 or RFC 4226.

The operations performed by the payer device processor may further comprise send an electronic message comprising a request to subscribe the payer device to a push transaction service configured to enable the merchant device to autonomously push a transaction information message to a subscribed payer device.

The operations performed by the payer device processor may further comprise in response to receiving user input requesting the payer device to subscribe to the push transaction service, send the electronic message.

Subscribe the payer device to the push transaction service may further comprise send the electronic message to the authorization server.

The operations performed by the payer device processor may further comprise activate the payer device to receive the encrypted transaction information message from the merchant device.

The operations performed by the authorization server processor may further comprise receive, from the payer device processor, an electronic message comprising a request configured to subscribe the payer device to a push transaction service.

The operations performed by the authorization server processor may further comprise in response to receiving, from the payer device processor, an electronic message comprising a request to subscribe the payer device to a push transaction service, sending, to the merchant device, an electronic message indicating the payer device subscribed to the push transaction service.

The electronic message sent to the merchant device and indicating the payer device subscribed to the push transaction service may further comprise the transaction initiation indication.

The electronic message sent to the merchant device and indicating the payer device subscribed to the push transaction service may further comprise a wireless data communication interface address configured in the payer device.

The operations performed by the merchant device processor may further comprise in response to detecting a wireless data communication interface address configured in the payer device, send the encrypted transaction information message to the payer device.

The electronic message sent to the merchant device and indicating the payer device subscribed to the push transaction service may further comprise a phone number configured in the payer device.

The electronic message sent to the merchant device and indicating the payer device subscribed to the push transaction service may further comprise a phone number associated with the payer device.

The electronic message sent to the merchant device and indicating the payer device subscribed to the push transaction service may further comprise an email address configured in the payer device.

The operations performed by the payer device processor may further comprise hosting a server process implementing the VPN configured to be communicatively coupled with the payer device processor and the merchant device processor.

The operations performed by the payer device processor may further comprise configuring a wireless network communication interface in the payer device to provide the VPN using a wireless hotspot configured in the payer device.

The operations performed by the payer device processor may further comprise configuring the wireless network communication interface to broadcast a Service Set Identifier (SSID) determined based on a Time-based one-time password (TOTP) and wherein the operations performed by the merchant device further comprise configuring the merchant device to connect to the wireless network communication interface broadcasting the SSID determined based on the TOTP.

The operations performed by the payer device processor may further comprise configuring a Domain Name System (DNS) server to resolve a plurality of hostnames to network addresses for a plurality of hosts reachable on the VPN, wherein at least one hostname is predetermined as a hostname for the merchant device and the hostname for the merchant device is distributed to the payer device by the authorization server during payer registration.

The operations performed by the payer device processor may further comprise configuring the VPN to have a password determined as a Time-based one-time password (TOTP).

The operations performed by the payer device processor may further comprise configuring access to the VPN based on the security key.

The operations performed by the merchant device processor may further comprise configuring the merchant device to connect to the VPN based on the security key.

The operations performed by the merchant device processor may further comprise hosting a server process implementing the VPN configured to be communicatively coupled with the payer device processor and the merchant device processor.

The operations performed by the merchant device processor may further comprise configuring a wireless network communication interface in the merchant device to provide the VPN using a wireless hotspot configured in the merchant device.

The operations performed by the merchant device processor may further comprise configuring access to the VPN based on the security key.

The operations performed by the payer device processor may further comprise connect to the VPN using the security key.

The operations performed by the merchant device processor may further comprise connect to the VPN using the security key.

An implementation provides various designs for completing transactions, such as touching a "Buy Now" button on a website or scanning a QR code using the payer application. In all these implementations, merchants never touch consumer information or card data, and purchases are completed with minimal actions, thereby eliminating traditional checkout processes. The system ensures that purchase transactions are fraud-proof by securely storing card information entered by consumers in the server's database and retrieving it only when a purchase is initiated.

The payer device authentication input interface may utilize multi-factor authentication methods to enhance security. This could involve a combination of something the user knows (password), something the user has (smartphone for receiving a verification code), and something the user is (biometric data).

The payer device image-capturing interface may enable the payer device to capture an image of the user or a specific object as an additional authentication factor. The image captured could be analyzed by the payer device processor or transmitted to the authorization server for verification.

The merchant device processor may generate a unique security key for each transaction to encrypt the transaction information message sent to the payer device. This security key may be generated based on a TOTP determined from a shared secret common to the payer device, merchant device and authorization server. This security key adds an extra layer of protection to the communication between the merchant and the payer device, safeguarding the transaction details from being compromised.

Voice recognition technology can also be integrated into the payer device authentication input interface. The interface may prompt the user to speak a passphrase or a series of words, which is then analyzed to verify the user's identity based on their unique voice patterns.

A combination of biometric modalities can be used for enhanced security. For instance, the payer device authentication input interface may require the user to provide both a fingerprint scan and a facial recognition scan for dual-factor authentication. This multi-modal biometric authentication approach adds an extra layer of security to the payment process.

The apparatus can be equipped with anti-spoofing measures to prevent unauthorized access through fake biometric inputs. This can include liveness detection techniques such as requiring the user to blink during a face scan or speak a randomly generated phrase during a voice sample, ensuring that the biometric input is coming from a live person.

In a retail environment, when a customer initiates a wireless transaction using their mobile device, the merchant device utilizes the near-field communications beacons or tags to securely send the encrypted transaction information message to the payer device. This ensures that the transaction data is transmitted efficiently and securely between the devices. Furthermore, the use of near-field communications technology offers a high level of convenience and security in various transaction scenarios. For instance, in a busy restaurant setting, the waiter can use the merchant device equipped with near-field communications beacons or tags to securely process payments at the customer's table. This eliminates the need for physical contact between the devices and streamlines the payment process for both parties involved. In addition to the above examples, alternative embodiments of the apparatus could include the integration of Bluetooth Low Energy (BLE) technology alongside or in place of near-field communications beacons or tags. BLE technology offers similar benefits in terms of proximity-based communication and could be utilized to achieve the same objective of securely transmitting transaction information between devices in a wireless transaction scenario.

The payer device may employ encryption techniques to further secure the stored payer tokens in its memory. By encrypting the token using a unique key or algorithm, the payer device adds an extra layer of security to prevent unauthorized access to the token. Moreover, the payer device may have a feature that collaborates with the authorization server to periodically update the stored payer token to enhance security. By refreshing the token at regular intervals or based on specific triggers, the payer device reduces the risk of token misuse or unauthorized access. Furthermore, the payer device could be designed to support multiple payer tokens for different payer accounts. This capability allows the device to manage and store various tokens securely, enabling the payer to switch between accounts seamlessly during transactions. In another scenario, the payer device may have a user interface that allows the payer to view and manage the stored payer tokens. Through the device's interface, the payer can review the tokens, delete outdated ones, or add new tokens as needed, providing flexibility and control over the stored information.

The merchant device may be equipped with a specialized sensor that detects changes in the electromagnetic field surrounding the device. When the payer device comes into close proximity with the merchant device, it triggers a change in the electromagnetic field, which is then detected by the sensor in the merchant device. This change in the field serves as a signal for the merchant device to initiate the wireless detection process. For example, consider a scenario where a customer with a payer device approaches a merchant device at a point of sale terminal in a retail store. As the payer device gets closer to the merchant device, the electromagnetic field around the two devices interacts, causing a detectable change in the field. The sensor in the merchant device picks up this change and interprets it as a signal to begin the wireless detection process of the wireless data communication interface address configured in the payer device. The merchant device may emit a specific ultrasonic sound wave that is inaudible to humans but can be detected by the payer device. When the payer device picks up this ultrasonic signal, it responds by transmitting its wireless data communication interface address to the merchant device for further communication. For instance, imagine a situation where a customer approaches a self-checkout kiosk in a supermarket with their payer device. The kiosk emits a brief ultrasonic signal that prompts the payer device to send its wireless data communication interface address to the kiosk, enabling a secure and seamless transaction process to take place.

In an illustrative example, when a customer with the payer device approaches the merchant device, the wireless detection mechanism is triggered. The merchant device actively scans for the unique wireless data communication interface address associated with the payer device. Once the address is detected, a secure communication link is established between the two devices, enabling data exchange for payment processing. An alternative implementation of the wireless detection process could involve the use of Bluetooth Low Energy (BLE) technology. In this scenario, the merchant device broadcasts a BLE signal, while the payer device scans for nearby BLE signals. When the payer device detects the specific signal from the merchant device, it responds with its unique address, initiating the connection process for transaction authorization.

The apparatus, as described above, may comprise a security key. The determination of this security key may be a collaborative process involving the authorization server processor, the payer device processor, and the merchant device processor. The security key is determined as a function of time and a shared secret. The shared secret is generated by the authorization server processor. Furthermore, the apparatus may comprise a distribution mechanism for the shared secret. This distribution mechanism may be facilitated by the authorization server processor and involves the payer device and the merchant device. The shared secret may be distributed to the payer device and the merchant device when they register with the authorization server. This algorithm could involve generating a new security key at regular time intervals, such as every minute, to enhance the security of the communication between the devices. As an example, the security key could be determined using a time-based one-time password (TOTP) algorithm, where each device in the system has a synchronized clock and uses the current time to generate a unique security key that is only valid for a short period. This time-sensitive security key adds an extra layer of protection against unauthorized access or interception of sensitive data during wireless communication.

The security key could be determined based on a challenge-response mechanism where the authorization server processor sends a random challenge to the payer device and the merchant device. Both devices then use the shared secret and the challenge to compute a response, which is used to derive the security key for the ongoing communication session. The distribution mechanism for the shared secret facilitated by the authorization server processor could involve a secure key exchange protocol such as Diffie-Hellman key exchange. During the registration process with the authorization server, the payer device and the merchant device could establish a secure communication channel to exchange cryptographic keys without exposing the shared secret to potential eavesdroppers. The distribution mechanism could utilize a public-key infrastructure (PKI) where the authorization server issues digital certificates to the payer device and the merchant device. These certificates could contain the necessary information to securely derive the shared secret for establishing a secure communication channel between the devices.

The apparatus, as described above, may comprise a security key. The security key further may comprise a base form of a predetermined general code. For example, the base form of the predetermined general code may consist of a series of alphanumeric characters that are combined with transaction-specific data to create a one-time security key. This dynamic generation of security keys enhances the security of the transaction by ensuring that each key is unique and cannot be reused for unauthorized purposes. The security key may be generated using a cryptographic algorithm that combines the base form of the predetermined general code with a random number or timestamp. This cryptographic process produces a secure and unpredictable security key that is used to authenticate the transaction between the merchant device and the payer device. By leveraging cryptographic techniques, the apparatus can prevent unauthorized access to sensitive transaction data and protect the integrity of the wireless communication interface. The security key may be transmitted between the merchant device and the payer device using a secure communication protocol, such as Transport Layer Security (TLS) or Secure Sockets Layer (SSL). This encrypted communication channel ensures that the security key remains confidential during transmission and cannot be intercepted by malicious actors. By establishing a secure connection between the devices, the apparatus maintains the privacy and integrity of the transaction data exchanged during the wireless detection process.

Security key redetermination may occur at regular intervals, such as every 24 hours, to minimize the risk of unauthorized access or interception of sensitive data during wireless transactions. During the redetermination process, the merchant device and the payer device may engage in a secure authentication protocol to establish a new security key that will be used for subsequent data transmissions.

The security key redetermination process may be triggered by specific events, such as a change in the network environment or suspected security breach. In such cases, the merchant device and the payer device may automatically initiate the key redetermination process to enhance the security of their communication channel.

The security key redetermination process may involve the generation of a new encryption key based on a combination of factors, such as random number generation, time-based algorithms, and device-specific identifiers. This dynamic approach to key management adds an extra layer of security to the wireless data communication interface, making it more resilient to potential cyber threats.

Both the payer device and the merchant device may be granted access to the Virtual Private Network (VPN) governed by a security key. This mechanism can involve the generation of a unique encryption key for each transaction conducted between the payer device and the merchant device. The encryption key can be dynamically generated based on various parameters such as transaction ID, timestamp, and device identifiers. This dynamic encryption key adds an extra layer of security to the wireless communication between the devices, ensuring that the data exchanged during the transaction remains confidential and secure. The encryption key generation may be TOTP-based. For example, when a transaction is initiated between the payer device and the merchant device, a unique encryption key is generated based on the transaction details. This encryption key is then used to encrypt the data transmitted between the devices, making it unreadable to any unauthorized third parties. The encryption key is only valid for the duration of the transaction and is securely discarded once the transaction is completed, ensuring that each transaction is protected by a unique and temporary encryption key.

The security key may be generated based on industry-standard algorithms such as RFC 6238 or RFC 4226. For example, in one embodiment, the security key generation module may utilize the Time-based One-Time Password (TOTP) algorithm specified in RFC 6238. This algorithm generates a unique security key based on the current time and a shared secret key. The security key is then used to authenticate the communication between the merchant device and the payer device. The security key generation module may implement the Hash-based Message Authentication Code (HMAC) algorithm described in RFC 4226. This algorithm uses a cryptographic hash function to generate the security key based on a counter value and a shared secret key. The generated security key is used to verify the integrity and authenticity of the wireless data communication interface address during the wireless detection process. In another embodiment, the security key generation module may comprise a hybrid security key generation algorithm providing enhanced security features by incorporating aspects of both time-based and counter-based security key generation methods.

An implementation may be configured to cause a payer device to receive, merchant identification, kiosk identification identifying the merchant kiosk, a merchant IP address, a security key, transaction information or any combination of these. The code may be further configured to cause the payer device to transmit to an authorization server: the merchant identification, the kiosk identification, the security key and the transaction information and payer identification associated with the payer device in an authorization database of the authorization server. Further, the payer device may transmit the merchant IP address and/or a payer IP address. The code may be further configured to cause the payer device to receive an authorization notification based upon an authorization report received by the authorization for a transaction referred to by the transaction information.

Modifications to embodiments of the disclosure described in the foregoing are possible without departing from the scope of the disclosure as defined by the accompanying claims. The overall appeal of disclosed systems and methods may be improved for both payers and merchants.

Disclosed systems, methods and payer-controlled payment processing services facilitate a variety of value or credit exchange transactions including within the gift card, e-check, wire transfer, swift international fund transfer industries. Within credit card and/or debit card industries disclosed systems, methods and payer-controlled payment processing services support in-person transactions, e-commerce online purchases as well as mail order and telephone order transactions.

Loans may be requested, loan funding may be obtained or loan payments may be made. A business to business payment system may be provided for vendors and suppliers as well as many other business to business enhancements. Coupons and specials may be offered as targeted to the payer. Coupons and/or specials may be redeemed with an electronic record. Prizes and sweepstakes may be offered to stimulate payer visits to merchant locations. Disclosed systems and methods may be integrated with merchant point of sale systems.

The disclosure seeks to describe a method for payment authorization. The method includes, receiving, from a payer device merchant identification, kiosk identification identifying a merchant kiosk, a security key and transaction information transmitted to the payer device from a merchant device registered with the merchant identification and payer identification associated with the payer device. The method further includes validating the merchant identification, the kiosk identification, the payer identification and the security key when the merchant identification is registered with the kiosk identification in an authorization database, the payer identification is registered with a payer token in the authorization database and the security key is valid. A transaction request is derived from the validated merchant identification, the payer token with which the payer identification is registered and the transaction information and for a transaction referred to by the transaction information. The method further includes receiving, from an acquirer system, an authorization report based upon the transaction request.

The disclosure further seeks to describe a system for payment authorization. The system includes an authorization database and an authorization server. The authorization server is configured to receive, from a payer device, a payer identification associated with the payer device as well as merchant identification, kiosk identification identifying a merchant kiosk, a security key and transaction information transmitted to the payer device from a merchant device registered with the merchant identification. The authorization server is further configured to validate the merchant identification, the kiosk identification, the payer identification and the security key when the merchant identification is registered with the kiosk identification in an authorization database, the payer identification is registered with a payer token in the authorization database and the security key is valid. A transaction request is derived from the validated merchant identification, the payer token with which the payer identification is registered and the transaction information. For a transaction referred to by the transaction information the authorization server is configured to receive, from an acquirer system, an authorization report based upon the transaction request.

The disclosure further seeks to describe a computer program product including a non-transitory computer-readable storage medium storing computer-executable code for payment authorization. The code, when executed, may be configured to cause one or more computers to receive, from a payer device: merchant identification, kiosk identification identifying a merchant kiosk, a security key and transaction information transmitted to the payer device from a merchant device registered with the merchant identification and payer identification associated with the payer device. The code, when executed may be further configured to cause one or more computers to validate the merchant identification, the kiosk identification, the payer identification and the security key when the merchant identification is registered with the kiosk identification in an authorization database, the payer identification is registered with a payer token in the authorization database and the security key is valid. A transaction request may be derived from the validated merchant identification, the payer token with which the payer identification is registered and the transaction information. For a transaction referred to by the transaction information, the code when executed may be configured to cause one or more computers to receive, from an acquirer system, an authorization report based upon the transaction request.

The disclosure, still further, seeks to describe a computer program product including a non-transitory computer-readable storage medium storing computer-executable code for transaction validation. The code, when executed, may be configured to cause a payer device to receive, merchant identification, kiosk identification identifying the merchant kiosk, a security key and transaction information. The code may be further configured to cause the payer device to transmit, to an authorization server: the merchant identification, the kiosk identification, the security key and the transaction information and payer identification associated with the payer device in an authorization database of the authorization server. The code may be further configured to cause the payer device to receive an authorization notification based upon an authorization report received by the authorization for a transaction referred to by the transaction information.

Still further, the disclosure seeks to provide a method for payment authorization, including receiving, from a cardholder device registered with a cardholder identification, merchant identification and transaction information transmitted to the cardholder device from a merchant device registered with the merchant identification and the cardholder identification. A transaction request may be derived from the cardholder identification and the transaction information. The transaction request may be transmitted to an acquirer device, an authorization may be received from the acquirer device for a transaction referred to by the transaction information and transaction approval codes may be transmitted for the transaction to the merchant device based upon the authorization.

As used herein the expression "including" is intended to be construed in a non-exclusive manner, namely allowing for items, components or elements not explicitly described also to be present. Reference to the singular is also to be construed to relate to the plural except where the context indicates otherwise.

Various implementations may be configured to provide one-touch, push sale transactions. In an illustrative example, a one-touch or push sale transaction may be characterized by the ability to make a purchase in a single action using a phone and an app.

An implementation may permit a consumer to touch a "Buy Now" button on a website or electronic advertisement (banners, email, social media post, etc.). The button may be configured to open or wake up the payer application and display a confirmation message requesting consumer approval using the payer device. If approved by the consumer using the payer device 700, the sale is completed. No forms, no inserting card numbers and the merchant (the ad owner) never sees any card or tokenized card number.

An implementation may permit a consumer using the payer application 716 to scan a QR code placed anywhere (billboards, magazines, letters, posters, etc.) and after consumer approval using the payer device 700, the sale is completed with no other actions required such as entering name, card number, etc. The ability to make a purchase outside of a store may be referred to as "Anywhere Commerce."

An implementation may permit a consumer to provide a mobile phone number to a sales agent while on a phone call or anytime afterwards, and having a purchase offer sent to the customer's phone using the payer application 716. The customer approves the offer using the payer application 716 and completes the sale with no other actions or steps required.

In all aspects, merchants never touch consumer information or card data. And purchases are completed with one action—two if counting the approval step, three if additional purchase information is required such a size, color, etc. But the typical checkout process is completely removed from a purchase experience. The checkout process is owned by the consumer not the merchant. Merchants, in effect, send their products to the consumer's checkout for purchase.

In illustrative examples, one-touch or push sale technology in accordance with the present disclosure may be summarized in the following steps.

STEP 1: Consumer downloads and installs the payer application 716 from an app store or any other place.

STEP 2: Consumer sets up an account and enters a credit or debit card in the wallet of the payer application 716.

STEP 3a: While using a web browser on a phone, consumer touches a button used to make a purchase. After confirmation that the consumer intends to make a purchase, the purchase is completed using the payer application 716 with no additional actions required.

STEP 3b: While browsing the web on a desktop computer, or other location and sees a one-touch, buy now QR code (or any other barcode), the consumer scans the QR code using the payer application 716 and after confirmation, the sale is completed with no other steps required.

STEP 3C: While a consumer is on a sale call or ordering call, they provide the agent with their mobile phone number (it could be possible the agent already has their phone number). While on the call or anytime thereafter, the agent sends a Push Sale or purchase offer using the consumer's phone number and entering it on a merchant kiosk. When the consumer opens the offer and approves it, the sale is complete, requiring no other actions.

The Push Sale and One Touch purchase eliminates any checkout processes, a purchase can be completed with one action. And since the merchant never sees/touches card or personal information, the purchase is transaction fraud-proof.

Card information is entered only once when the consumer enters it in the payer application 716 wallet. The card data is not stored on the consumer's phone but gets sent to our server and stored securely there. When a purchase is initiated via Buy Now or purchase button, the action is sent to our server where the consumer is identified by the ID we provided them with when they setup the payer application 716 on their device. When the payer application 716 is installed on the consumer's device, the consumer's device becomes the payer device 700 referred to herein. The consumer's ID is matched in the database and card information is retrieved then sent to the acquiring bank. The response from the acquiring bank is then passed on to the consumer and the merchant, whether the sale was successful or canceled. If declined, only the consumer is notified, where upon they can choose a different card in their wallet to use. The consumer can also cancel the purchase, at which point, the merchant is notified that the consumer canceled the sale only. The merchant is not privy to any negative response from the acquiring bank.

At least the following features disclosed herein are new:

A financial app that does not store card data on the consumer device.

A button to initiate a purchase that directs the consumer to their own checkout process contained in the payer application 716.

The ability to make a purchase by touching a button, scanning a QR or barcode, or accepting an offer sent to the app on the consumer's device, without having to complete a checkout form in any way.

A purchase action that does not direct the consumer to a checkout form but to a purchase confirmation screen.

Confirming a purchase action completes the sale/transaction in its entirety.

Sending a Purchase Offer to a consumer's device (via sales person, rep, etc.) that allows the consumer to complete a purchase in its entirety by accepting the offer.

Scanning a QR or barcode that enables the consumer to complete a purchase with no other additional steps besides confirmation.

Various implementations of the invention may achieve one or more advantageous technical effects, such as for example:

Ability to complete a purchase without completing a checkout form, or physically checkout without going through a register/checker.

Ability to complete a purchase anywhere a button, or QR/barcode can be displayed.

Ability to complete a purchase without reading a card number over the phone.

Never having to share personal and card data with a merchant.

Various disclosed features of the invention may be implemented using alternatives, such as for example:

The method of storing card data could be changed to other methods/platforms.

The process of sending card data to an acquiring bank could be changed to working directly with the issuing bank.

The consumer app 716 and merchant kiosk could be browser-based instead of using phones and tablets.

A pop-up message could be used to initiate a purchase instead of requiring a consumer to touch a button or scan a QR/barcode.

A robo-caller could be used to send (spam) purchase offers to consumer devices. A URL could be used in place of scanning a QR/barcode.

The consumer would have to open a web browser and enter the posted URL which would display a confirmation, then process the transaction.

An implementation in accordance with the present disclosure may be used for alternative purposes such as for example:

Sharing credit or debit cards with others.

Could be used to opt-in to receive information, offers, sales from merchants.

Could be used for fraud-proof voting.

Could be used for peer-to-peer payments.

An implementation in accordance with the present disclosure may implement operations differently from the current State of the Art, such as for example:

In the context of the present disclosure, the consumer owns the checkout which consists of a single action (By contrast, in the Prior Art, a product for sale had to be sold in a store either on or off-line (a store in no longer required since the checkout resides with the consumer).

In the present disclosure, the merchant no longer process payment, the consumer does.

One no longer has to browse or shop in a store. A product could be purchased anywhere.

One no longer has to read a card number over the phone. Various examples may perform their function differently from, or better than, these prior devices or methods, providing greater efficiency and security throughout the entire purchase process. Once a purchase action is initiated, the present disclosure's operation is completely different than the prior art designs.

Conventional systems direct a consumer to a checkout process whether on or offline, where they provide personal and/or payment information. The merchant then sends card data to an acquiring bank for processing. The present disclosure has the merchant providing sales information to the consumer, then the consumer sends notice to our server, which sends it to the acquiring bank of the consumer's desire to make a purchase. Acquirers process in the same way as conventional acquirers today, however with conventional systems the acquiring bank sends a response to the merchant. With our system the acquiring bank sends a response to our server, and we send the response to the consumer and if successful, a confirmation of the sale to the merchant.

Conventional processes direct consumers to their stores in order to make a purchase. Our process directs the consumer to their phone/payer app 716 where they complete the process in the moment. Conventional systems require the consumer to complete a checkout form and provide their card information. Our system only requires the consumer to accept the sale to complete the purchase.

Conventional sales calls require the consumer to give the merchant their card number by reading it out loud or some other method such as email or texting. With our system, the consumer only gives the merchant their phone number. The merchant then sends the consumer a Purchase Offer. If they accept it, the sale is done.

Various implementations in accordance with the present disclosure may cause technical effects that solve or mitigate one or more problems, such as for example: Security, Ease of purchase process, Ability to purchase anywhere and Merchants no longer have to corral consumers into their stores. For example:

Prior Art systems share various deficiencies; for example a transaction conventionally has several weak points between receiving card data from the consumer, providing it to the acquiring bank, and receiving a response. Additional weak points appear if the merchant stores card numbers.

By contrast with these technically deficient prior art systems, an implementation in accordance with the present disclosure is superior at least since no card data is shared with the merchant, all transaction weak points disappear.

In an illustrative example from the perspective of the user, an implementation in accordance with the present disclosure may provide at least some of the following features:

When online viewing with a desktop computer, a user sees an advertisement with a Kubera QR/barcode on it and desires to purchase. The user may scan the code using the Kubera App, approve the purchase, done.

When online viewing with a phone, a user sees an advertisement with a Kubera Buy Now button. They touch it, approve the purchase, done.

When phone ordering, a user is ordering goods over the phone (user initiated or telesales). They give (speak) their phone number to the agent. Agent sends a Purchase Offer to the user. User approves the purchase, done.

An implementation in accordance with the present disclosure may provide a technical solution in the form of a one-touch (action) purchase. An implementation may provide this by restructuring the players of the transaction process, putting the consumer in control.

An implementation in accordance with the present disclosure puts the consumer/buyer in control of the transaction and the entity that communicates with the payment networks, instead of the merchant which is how ALL other payment platforms work (even when they seem to claim otherwise).

We placed the whole checkout process in the hands of the consumer, akin to consumers carrying around a cash register that is able to link to every merchant's bank. The only role merchants play is advertising/enticing consumers to buy their wares.

An implementation in accordance with the present disclosure may provide various features such as for example:

Duplicate User Accounts

When setting up a user account on the app 716 residing on a payer device, the app 716 queries a database residing on a remote server looking for a duplicate phone number (Only one account per phone number/device).

If duplicate found, stops account creation and notifies user of duplicate and directs user to login.

Besides entering a password, user must answer three security questions that they entered; not canned questions. This increases security exponentially.

Duplicate Cards

When user enters cards in the wallet of the app 716 on a payer device, the app 716 queries a database on a remote server for the card number.

If card number is found, the user the card number is associated with, is notified that someone else is trying to add their card to their wallet.

The original enter-er or first enter-er of the card has the option to allow it (if they are allowing someone else to use the card, such as a spouse, child, etc.), or decline it.

If declined, the user attempting to add the card to their wallet is provided with a general error and encouraged to try again (in the event they merely entered the card number wrong).

Account Recovery

When installing an account on a new app 716 on a payer's device, the user must enter the phone number, password, and security questions associated with their account.

The security questions the user must answer were created by the user, not canned questions every user must answer. This in essence creates four password/pass phrases a user must enter correctly to reclaim their account.

Once an account has been successfully reclaimed, the user must re-enter all their cards. Cards are all deleted upon an account reclamation.

Returns

If a merchant initiates a return, the customer is notified and must approve the return before it is allowed to proceed.

If a consumer initiates a return, the merchant is notified and must approve the return.

Location & Purchase Security

As part of the validation process at the time of a sale, the current location (longitude and latitude) is read from the device and passed with the purchase offer and/or within the QR code that the consumer scans with their device.

If the lat/lon does not match the lat/lon on file (within 20 feet), which was captured during the kiosk setup, the sale fails, returns an error message and notifies an admin and the merchant.

During an in-person or face-to-face transaction, the kiosk and the user device (phone) both must have matching lat/lon (within 20 feet). If not, the sale will fail and a notification is sent to the authorization server and the merchant.

New Kiosk Setup

When setting up a new kiosk, and before the merchant app install is initiated on the kiosk (tablet), a text or email is sent to the merchant admin or manager containing a code that must be entered into the kiosk in order to complete the install.

This prevents rogue kiosk installs on the merchant's kiosk network.

Decline Privacy

When a card is declined, only the consumer is notified. The consumer has the option to try a different card or cancel the sale.

If a different card is selected from the wallet and is approved, the merchant is notified of the sale but not of any issues the consumer dealt with (a decline).

The consumer can choose to decline the sale and the merchant will just be notified that the consumer declined to make the purchase, and nothing else, thus providing increased consumer financial privacy and prevents the cashier from announcing with a bullhorn, "YOUR CARD WAS DECLINED!"

Automatic Card Queue

A consumer can order their cards in the wallet in the app 716 on a payer device.

If a card is declined or doesn't have enough credit for a purchase (or such as a gift card with a small balance), the next card will be automatically used to clear the balance of the transaction.

In this event, the merchant is none the wiser and the consumer maintains financial privacy.

Push Sale

Instead of a merchant sending an email/postal campaign to entice consumers to click-through to their website, merchants can send a QR code (purchase code) in an email or text.

If the consumer wants to purchase, they just scan the QR in the ad or email). No longer does the consumer have to click through to the merchant's website and browse the catalog in order to purchase; greatly capitalizing on impulse buying.

A merchant can also send a purchase offer right to the consumer's app 716 where all the consumer needs to do is accept it and the sale is completed in the moment.

Similarly, a merchant can include a QR (purchase code) in print and digital advertising where the consumer can purchase right from the ad, whether the ad is a mailer, TV, online ad, bus signage, billboards, business cards, even a tattoo.

The sale takes place at the consumer's Point-of-need, not the merchant's Point-of-sale. A merchant can have a checkout and sale whenever and wherever the customer needs/wants it.

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
   an authorization server comprising:
   an authorization server processor; and
   an authorization server memory, wherein the authorization server memory is configured to be operably coupled with the authorization server processor, and wherein the authorization server memory comprises processor executable program instructions configured to cause the authorization server to perform operations;
   an authorization database configured to be operably coupled with the authorization server processor;
   a payer device comprising:
   a payer device processor;
   a payer device memory, wherein the payer device memory is configured to be operably coupled with the payer device processor, and wherein the payer device memory comprises processor executable program instructions configured to cause the payer device to perform operations;
   a payer device authentication input interface configured to be operably coupled with the payer device processor, the payer device authentication input interface configured to receive user input;
   a payer device image-capturing interface configured to be operably coupled with the payer device processor; and
   a payer device near-field communication interface configured to be operably coupled with the payer device processor;
   a merchant device comprising:
   a merchant device processor; and
   a merchant device memory, wherein the merchant device memory is configured to be operably coupled with the merchant device processor, and wherein the merchant device memory comprises processor executable program instructions configured to cause the merchant device to perform operations;
   a communication network, configured to be operably coupled with one or more of the authorization server processor, the payer device processor, the merchant device processor and an acquirer system;
   a VPN configured to be communicatively coupled with the payer device processor and the merchant device processor, wherein the VPN is configured to tunnel through the communication network; and
   the operations performed by the merchant device further comprise: in response to the merchant device receiving a transaction initiation indication from a web page button clicked by a payer, the transaction initiation indication comprising a purchase request referencing the payer device, send an encrypted transaction information message to the payer device from the merchant device using at least the VPN, and wherein the encrypted transaction information message comprises merchant ID, a security key and transaction information referencing the purchase request.

2. The apparatus of claim 1, wherein the payer device authentication input interface is configured to receive a biometric input.

3. The apparatus of claim 2, wherein the biometric input the payer device authentication input interface is configured to receive further comprises one or more of: a fingerprint scan, a retina scan, a face scan, a voice sample, a touch gesture, a motion gesture, or a touch pattern.

4. The apparatus of claim 1, wherein the payer device authentication input interface is configured to receive an alphanumeric input further comprising one or more of a password or passcode.

5. The apparatus of claim 1, wherein the payer device image-capturing interface is configured to read data from an image scanned by the payer device image-capturing interface.

6. The apparatus of claim 5, wherein the payer device image-capturing interface further comprises a camera.

7. The apparatus of claim 1, wherein the operations performed by the payer device further comprise receive user input activating the payer device to initiate a transaction.

8. The apparatus of claim 7, wherein the user input activating the payer device to initiate a transaction further comprises one or more of a fingerprint scan, a retina scan, a face scan, a voice sample, a touch gesture, a motion gesture, a touch pattern, a password, or a passcode.

9. The apparatus of claim 1, wherein the operations performed by the payer device further comprise in response to receiving user input activating the payer device to initiate a transaction, send, to the merchant device, an electronic message comprising the transaction initiation indication and configure the payer device to receive the encrypted transaction information message from the merchant device.

10. The apparatus of claim 1, wherein the payer device near-field communication interface is configured to receive data from one or more near-field communications beacons or tags.

11. The apparatus of claim 1, wherein the operations performed by the payer device processor further comprise in response to a payer using the payer device to click the web page button, send the transaction initiation indication to the merchant device.

12. The apparatus of claim 1, wherein the operations performed by the merchant device processor further comprise encode a purchase offer in an image and display the image.

13. The apparatus of claim 1, wherein the operations performed by the payer device processor further comprise scan an image displayed by the merchant device and decode a purchase offer from the scanned image.

14. The apparatus of claim 13, wherein the operations performed by the payer device processor further comprise in response to determining the purchase offer in the scanned image is valid, present the purchase offer to the payer for approval.

15. The apparatus of claim 14, wherein the operations performed by the payer device processor further comprise in response to receiving payer approval, creating a purchase request based on the purchase offer in the scanned image and send the purchase request to the authorization server.

16. The apparatus of claim 1, wherein the operations performed by the merchant device processor further comprise push an SMS message comprising a purchase offer to a phone number associated with the payer device.

17. The apparatus of claim 1, wherein the operations performed by the payer device processor further comprise receive a purchase offer in an SMS message from the merchant device.

18. The apparatus of claim 17, wherein the operations performed by the payer device processor further comprise in response to determining the purchase offer in the SMS message is valid, present the purchase offer to the payer for approval.

19. The apparatus of claim 18, wherein the operations performed by the payer device processor further comprise in response to receiving payer approval, create a purchase request based on the purchase offer in the SMS message and send the purchase request to the authorization server.

20. The apparatus of claim 1, wherein the merchant device further comprises one or more near-field communications beacons or tags configured to be operably coupled with the merchant device processor, the one or more near-field communications beacons or tags configured to present data, and wherein send the encrypted transaction information message to the payer device from the merchant device further comprises using at least the one or more near-field communications beacons or tags if a type of transaction initiated is wireless.

21. The apparatus of claim 1, wherein the merchant device further comprises a graphical display configured to be operably coupled with the merchant device processor, wherein the graphical display is configured to display an image, and wherein send the encrypted transaction information message to the payer device from the merchant device further comprises using at least the graphical display if a type of transaction initiated is physical point of sale.

22. The apparatus of claim 21, wherein the image further comprises at least one of a bar code or a QR code.

23. The apparatus of claim 1, wherein the operations performed by the merchant device further comprise encode the encrypted transaction information message in a bar code or a QR code and display the bar code or the QR code.

24. The apparatus of claim 1, wherein the authorization server provides the security key to the payer device and the merchant device.

25. The apparatus of claim 1, wherein the operations performed by the authorization server further comprise receive, from the payer device, a payer device registration request, wherein the payer device registration request comprises payer ID and payer account information, and send, to the payer device, the security key.

26. The apparatus of claim 25, wherein the operations performed by the authorization server further comprise in response to receiving the payer device registration request, register the payer device, comprising associate and store the payer ID with the payer account information and the security key in the authorization database.

27. The apparatus of claim 1, wherein the operations performed by the merchant device further comprise configure a web page to display a button that when clicked by a payer using the payer device, sends the encrypted transaction information message to the payer device.

28. The apparatus of claim 1, wherein the operations performed by the authorization server further comprise receive, from the merchant device, a merchant device registration request, wherein the merchant device registration request further comprises merchant ID and merchant account information, and send, to the merchant device, the security key.

29. The apparatus of claim 28, wherein the operations performed by the authorization server further comprise in response to receiving the merchant device registration request, register the merchant device, comprising associate and store the merchant ID with the merchant account information and the security key in the authorization database.

30. The apparatus of claim 1, wherein the operations performed by the merchant device further comprise receive, from the authorization server, the security key and store the security key in the merchant device memory and wherein the operations performed by the payer device further comprise receive a selected payer token from the authorization server and store the selected payer token in the payer device memory.

* * * * *